United States Patent
Ostap et al.

(10) Patent No.: US 11,880,983 B2
(45) Date of Patent: Jan. 23, 2024

(54) IMAGE ENHANCEMENT SYSTEM

(71) Applicant: Logitech Europe S.A., Lausanne (CH)

(72) Inventors: Oleg Ostap, Camas, WA (US); Henry Levak, San Mateo, CA (US); Miguel Angel Maestre Trueba, Portland, OR (US); Viktor Sakharchuk, Volyn (UA); Yaroslav Vasilovich Tereshchenko, Kyiv (UA); Ihor Okhrimenko, Kyiv (UA)

(73) Assignee: LOGITECH EUROPE S.A., Lausanne (CH)

( * ) Notice: Subject to any disclaimer, the term of this patent is extended or adjusted under 35 U.S.C. 154(b) by 238 days.

(21) Appl. No.: 17/230,875

(22) Filed: Apr. 14, 2021

(65) Prior Publication Data

US 2022/0335620 A1 Oct. 20, 2022

(51) Int. Cl.
*G06T 7/194* (2017.01)
*H04N 7/15* (2006.01)
(Continued)

(52) U.S. Cl.
CPC ............ *G06T 7/194* (2017.01); *G06T 7/11* (2017.01); *G06T 7/174* (2017.01);
(Continued)

(58) Field of Classification Search
CPC ....... H04L 65/4015; G06T 2207/10016; G06T 7/11; G06T 7/194; H04N 7/15
See application file for complete search history.

(56) References Cited

U.S. PATENT DOCUMENTS 39,867 A * 9/1863 Fieldman ................ B41F 1/26
101/130
56,251 A * 7/1866 Parmar ................ B43K 23/001
24/709.8
(Continued)

FOREIGN PATENT DOCUMENTS

GB 2546724 A * 8/2017 .......... G06F 3/0425

OTHER PUBLICATIONS

Y. -L. Lee and T. Nguyen, "High frame rate Motion Compensated Frame Interpolation in High-Definition video processing," 2010 IEEE International Conference on Acoustics, Speech and Signal Processing, Dallas, TX, USA, 2010, pp. 858-861, doi: 10.1109/ICASSP.2010.5495214. 2010 (Year: 2010).*

(Continued)

*Primary Examiner* — Gandhi Thirugnanam
(74) *Attorney, Agent, or Firm* — Patterson & Sheridan LLP

(57) ABSTRACT

Embodiments of the present disclosure generally relate to livestreaming methods and systems, and more particularly to whiteboard presentation systems that can be used in a livestreaming or video conferencing environment. In some embodiments, the whiteboard presentation system is configured to perform one or more processing operations, such as capture images on a whiteboard, perform image processing routines on the captured images, and transmit processed images as a video feed to one or more remote users, such as people or locations attending a video conference. The image processing routines can include one or more operations such as image denoising, contrast enhancement, color reconstruction, segmentation of a presenter, and image reconstruction.

21 Claims, 17 Drawing Sheets

(51) Int. Cl.
*G06T 7/11* (2017.01)
*H04L 65/403* (2022.01)
*G06T 7/174* (2017.01)

(52) U.S. Cl.
CPC .......... *H04L 65/4046* (2013.01); *H04N 7/15* (2013.01); *G06T 2207/10016* (2013.01)

(56) References Cited

U.S. PATENT DOCUMENTS

| | | | | |
|---|---|---|---|---|
| 6,641,269 | B2 * | 11/2003 | Kitazawa | G06F 3/0425 |
| | | | | 353/122 |
| 7,224,847 | B2 * | 5/2007 | Zhang | H04L 67/131 |
| | | | | 348/E7.083 |
| 8,639,032 | B1 * | 1/2014 | Voorhees | G06V 20/49 |
| | | | | 382/187 |
| 9,721,148 | B2 * | 8/2017 | Ganong | G06V 40/172 |
| 10,540,757 | B1 * | 1/2020 | Bouhnik | G06T 7/37 |
| 10,991,067 | B2 * | 4/2021 | Appleboim | G06T 7/30 |
| 2004/0090424 | A1 * | 5/2004 | Hurley | G09G 5/00 |
| | | | | 345/169 |
| 2005/0286865 | A1 * | 12/2005 | Dorai | H04N 21/8455 |
| | | | | 386/E5.052 |
| 2017/0039867 | A1 * | 2/2017 | Fieldman | G09B 7/00 |
| 2021/0056251 | A1 * | 2/2021 | Parmar | G06F 3/04847 |
| 2021/0076105 | A1 * | 3/2021 | Parmar | G06F 3/0425 |
| 2021/0224590 | A1 * | 7/2021 | Matsumoto | G06V 40/103 |
| 2022/0335620 | A1 * | 10/2022 | Ostap | G06T 5/50 |

OTHER PUBLICATIONS

JongWon Kim, Young-Gook Kim, HwangJun Song, Tien-Ying Kuo, Yon Jun Chung and C. . -C. J. Kuo, "TCP-friendly Internet video streaming employing variable frame-rate encoding and interpolation," in IEEE Transactions on Circuits and Systems for Video Technology, vol. 10, No. 7, pp. 1164-1177, Oct. 2000 (Year: 2000).*

* cited by examiner

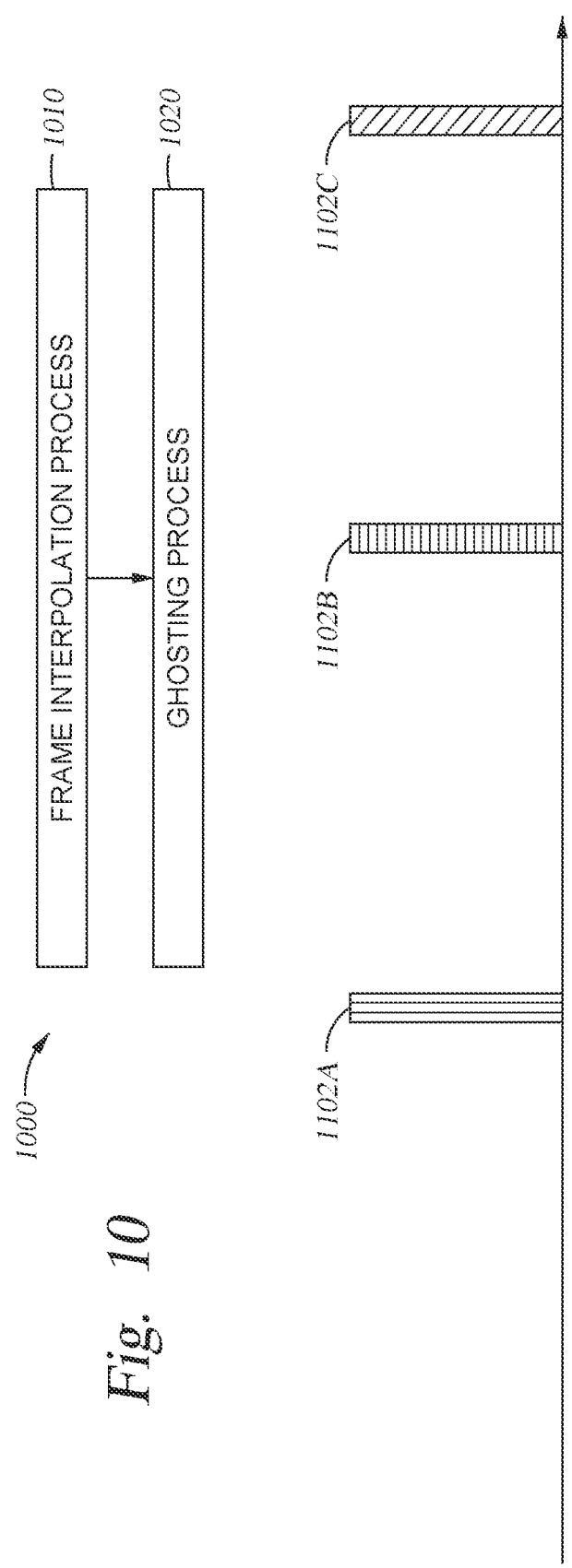
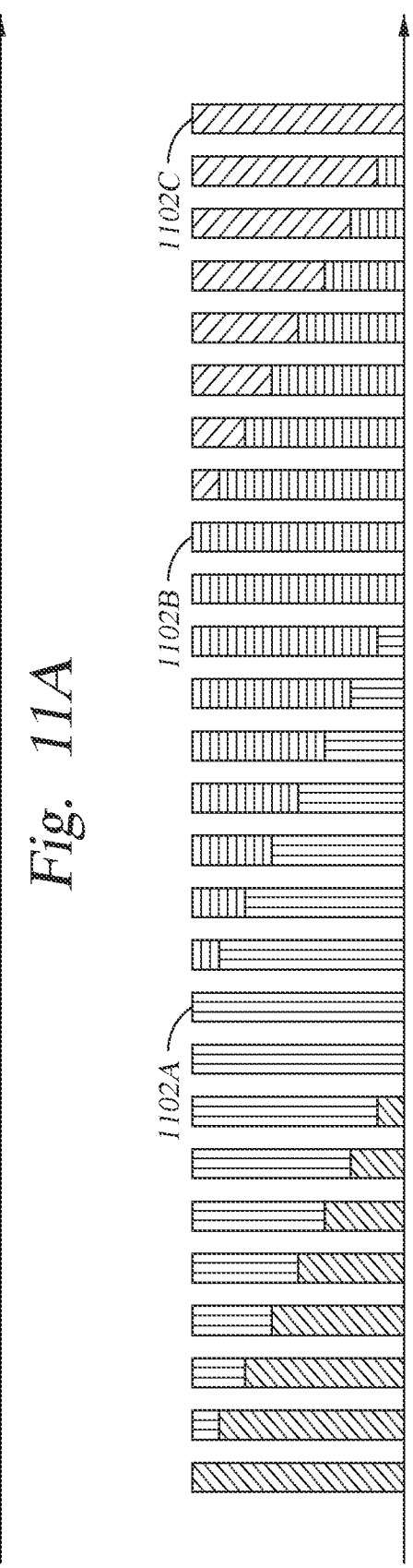
Fig. 10
Fig. 11A
Fig. 11B

IMAGE ENHANCEMENT SYSTEM

BACKGROUND

Field

Embodiments of the present disclosure generally relate to video conferencing systems, and more particularly, to whiteboard presentation systems used in a video conferencing environment.

Description of the Related Art

Video generating systems have become more popular in recent years, due in large part to the declining costs of video generating equipment, the proliferation of high-speed Internet, and a global movement towards remote work situations. As familiarity with video generating systems increases, so does demand for more sophisticated collaborative video streaming devices, such as whiteboard collaboration systems for these video applications.

In conference rooms, visuals, such as whiteboards, slides, finger-pointed documents, chart diagrams, or the like have been developed. The use of a traditional whiteboard may make collaborations in video conferences more effective and enhance distance learning. There have been developed whiteboard livestreaming systems, which process images on a whiteboard, removing obstructions (e.g., people or hands) and shadows and improving legibility crispness, and share the processed images in video conferences. Unfortunately, conventional whiteboard livestreaming systems have significant drawbacks, which include: (1) the need for increased computing power to deliver live video to avoid significant latency issues, and (2) insufficient methods of dealing with the real time interaction and obstruction of the information written on the whiteboard due to the presence of the user.

Accordingly, there is a need in the art for whiteboard livestreaming systems and related methods that solve the problems described above.

SUMMARY

Embodiments of the disclosure provide a method of processing images. The method includes capturing, by a camera device, a first image of a surface, where the first image comprises presentation information that is disposed on at least a portion of the surface, and a portion of a presenter that is disposed between the camera device and the surface, performing a presenter segmentation process, performing a canvas reconstruction process, performing a presentation information segmentation process, performing a background reconstruction process, and performing a background bleaching process. The canvas reconstruction process includes replacing the pixels in the first image that are associated with the detected portion of the presenter within the presenter mask to form a reconstructed canvas image. The presentation information segmentation process includes detecting presentation information in the reconstructed canvas image, and generating a presentation information mask that includes pixels in the reconstructed canvas image that contain portions of the presentation information. The background reconstruction process includes applying the generated presentation information mask to the reconstructed canvas image to determine the pixels that contain the portions of the presentation information, and reconstructing the pixels in the reconstructed canvas image that contain the portion of the presentation information to form a canvas background image. The background bleaching process includes removing imperfections in the reconstructed canvas image by dividing the reconstructed canvas image by the canvas background image.

Embodiments of the disclosure also provide a method of delivering presentation information disposed on a surface to an electronic device. The method includes performing, by a controller, a calibration process, and performing, by the controller, a canvas generation process. The calibration process includes capturing, by a camera device, a first image of a surface, determining corners of the surface in the first image, and determining size and shape of a canvas image having determined corners. The a canvas generation process includes capturing, by the camera device, a second image of the surface, wherein the second image comprises presentation information that is disposed on at least a portion of the surface, and a portion of a presenter that is disposed between the camera device and the surface, performing a presenter segmentation process, including detecting the portion of the presenter in a third image that is derived from the second image, and generating a presenter mask that is used to define pixels in the second image that are associated with the detected portion of the presenter, performing a canvas reconstruction process, including replacing the pixels in the second image that are associated with the detected portion of the presenter within the presenter mask to form a reconstructed canvas image, performing a presentation information segmentation process, including detecting presentation information in the reconstructed canvas image, and generating a presentation information mask that includes pixels in the reconstructed canvas image that contain portions of the presentation information, performing a background reconstruction process, including applying the generated presentation information mask to the reconstructed canvas image to determine the pixels that contain the portions of the presentation information, and reconstructing the pixels in the reconstructed canvas image that contain the portion of the presentation information to form a canvas background image, and performing a background bleaching process, including removing imperfections in the reconstructed canvas image by dividing the reconstructed canvas image by the canvas background image.

Embodiments of the disclosure further provide a system for delivering presentation information on a surface to an electronic device. The system includes a camera device, and a controller comprising a processor and a non-transitory computer readable medium that includes instructions. The instructions when executed by the processor are configured to cause the system to capture, by the camera device, a first image of a surface, where the first image comprises presentation information that is disposed on at least a portion of the surface, and a portion of a presenter that is disposed between the camera device and the surface, perform a presenter segmentation process, perform a canvas reconstruction process, perform a presentation information segmentation process, perform a background reconstruction process, and perform a background bleaching process. The canvas reconstruction process includes replacing the pixels in the first image that are associated with the detected portion of the presenter within the presenter mask to form a reconstructed canvas image. The presentation information segmentation process includes detecting presentation information in the reconstructed canvas image, and generating a presentation information mask that includes pixels in the reconstructed canvas image that contain portions of the presentation information. The background reconstruction process includes applying the generated presentation information mask to the reconstructed canvas image to determine the pixels that contain the portions of the presentation information, and reconstructing the pixels in the reconstructed canvas image that contain the portion of the presentation information to form a canvas background image. The background bleaching process includes removing imperfections in the reconstructed canvas image by dividing the reconstructed canvas image by the canvas background image.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 10 includes a flowchart illustrating a method of a video data generation process according to one embodiment.

FIGS. 11A and 11B illustrate examples of frame interpolation.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to livestreaming methods and systems, and more particularly to whiteboard presentation systems that can be used in a livestreaming or video conferencing environment. In some embodiments, the whiteboard presentation system is configured to perform one or more processing operations, such as capture images on a whiteboard, perform image processing routines on the captured images, and transmit processed images as a video feed to one or more remote users, such as people or locations attending a video conference. The image processing routines can include one or more operations such as image denoising, contrast enhancement, color reconstruction, segmentation of a presenter, and image reconstruction.

A digital image, or simply referred to herein as an image, as described herein will include rows and columns of pixels that each hold a digital value representing the brightness and/or color at a location of the pixel within the image. The digital values of the pixels can be stored in a computer memory as a two-dimensional array of small integers. In the description below, a digital image captured by a camera device is referred to as an "image," and a digital image that is generated by the methods described herein is referred to as a "canvas image," or simply as "canvas."

A mask, or a special filter, includes rows of a matrix of binary values, each of which corresponds to a point in an image. A point in the image may correspond to each pixel in the image or a plurality of nearby pixels within the image. A mask, or equivalently, the matrix of binary values associated with points in an image can be stored in a computer memory.

The term "whiteboard" as used herein is intended to broadly describe a surface on which information generated or presented by a user is to be formed or positioned such that the information can be captured and transmitted in a video feed to one or more remote users by use of a camera device. The surface can include a writing surface of an actual whiteboard, or a portion of a wall, table, notebook or other useful surface that can be viewed by a camera device that is configured to generate video data within a video feed. Video data described herein refers to a series of canvases concatenated at a certain speed. Each of the canvases may also be referred to as frames, and the rate at which canvases are updated (i.e., a new canvas is generated) is referred to as a frame rate.

Figure 1:
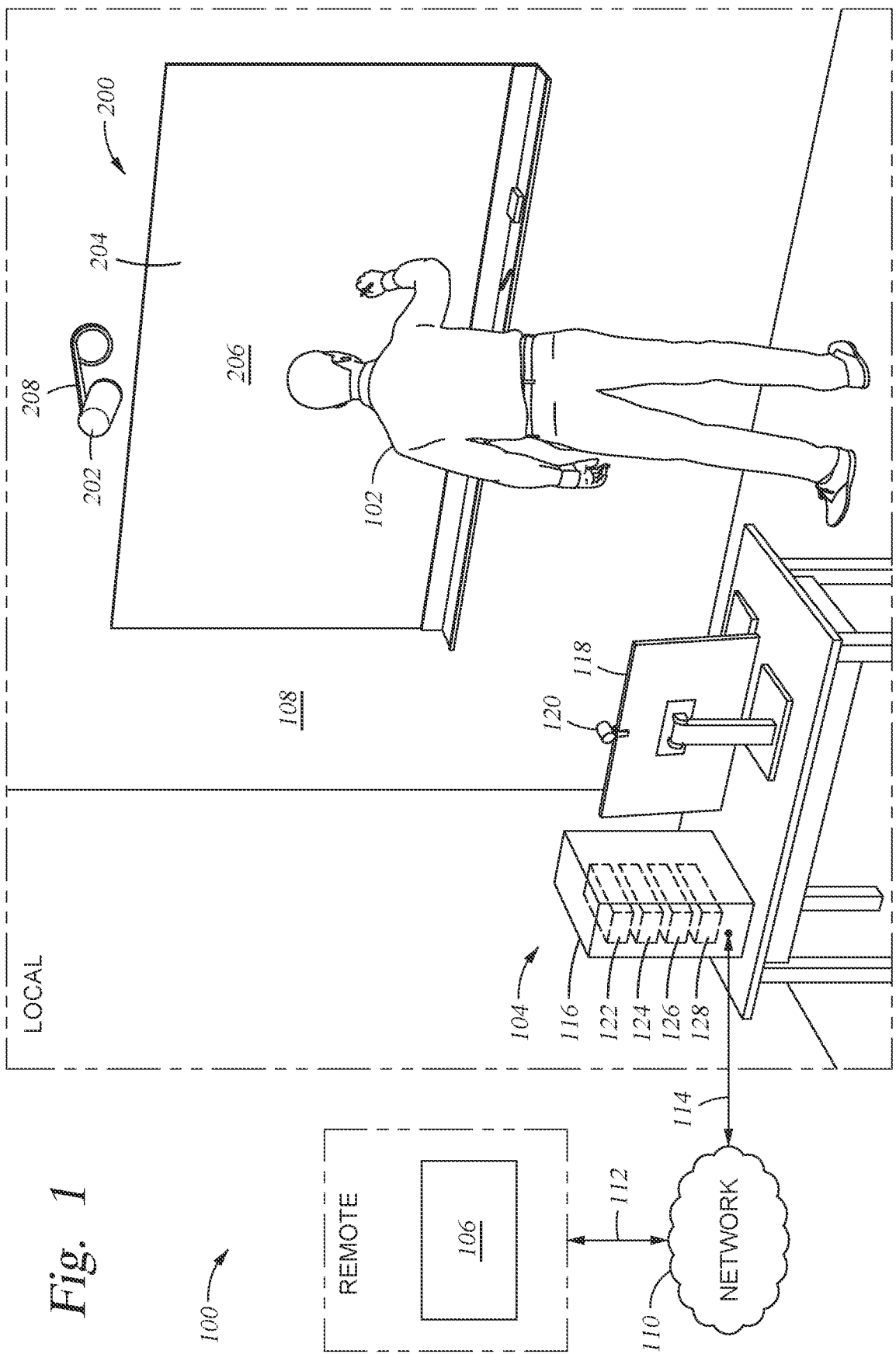
FIG. 1 is a schematic representation of a video conferencing environment 100 according to one embodiment.

FIG. 1 is a schematic representation of a video conferencing environment 100 according to one embodiment. The video conferencing environment 100 enables a whiteboard presentation in a video conference to be performed between a presenter 102 in a local environment L and one or more users (not shown) in a remote environment R. The video conferencing environment 100 includes a first video conferencing endpoint 104 at the local environment L and a second video conferencing endpoint 106 at the remote environment R. The first video conferencing endpoint 104 includes a whiteboard presentation system 200 and other equipment (e.g., camera, display, etc.) configured to perform the tasks associated with executing the video conference for the presenter 102 in the local environment L. Similarly, the second video conferencing endpoint 106 includes the equipment configured to perform the tasks associated with executing the video conference for user(s) in the remote environment R. As discussed below, the whiteboard presentation system 200 includes a camera device 202 and a whiteboard 204 having a drawing surface 206 thereon. The whiteboard 204 is to be mounted on a wall 108 and the camera device 202 is to be mounted on a rigid bar 208 that is used to orient, position and retain the camera device 202 so that it has a view of the drawing surface 206.

The video conferencing environment 100 further includes a network 110 that facilitates communication between the first video conferencing endpoint 104 and the second video conferencing endpoint 106. The network 110 generally represents any data communications network suitable for the transmission of video and audio data (e.g., the Internet) between different locations. Corresponding communication links 112, 114 are used to support the transmission of video conference feeds that include audio and video streams between the respective video conferencing endpoints 104, 106 and the network 110. These communication links 112, 114 can be, for example, communication links to a Local Area Network (LAN) or a Wide Area Network (WAN).

The first video conferencing endpoint 104 further includes a user device 116, a display 118, and a camera device 120. The user device 116 represents any computing device capable of transmitting a video stream to a remote video conferencing device (e.g., the second video conferencing endpoint 106) via the communication link 112 that is in communication with the network 110. Examples of the user device 116 can include, without limitation, a laptop, a personal computer, a tablet, and a smart phone. The user device 116 includes a processor 122, a memory 124, support circuits 126, and a video conferencing software application 128 stored in the memory 124. The memory 124 can include non-volatile memory to store the video conferencing software application 128. The processor 122 can be used to execute the video conferencing software application 128 stored in the memory 124. Execution of the video conferencing software application 128 can enable the user device 116 to transmit data (e.g., video data) received from the whiteboard presentation system 200 and the equipment (e.g., the camera device 120) in the first video conferencing endpoint 104 to the second video conferencing endpoint 106 via the communication link 112. Additionally, execution of the video conferencing software application 128 can also enable the user device 116 to receive data (e.g., audio and video data) from the second video conferencing endpoint 106, via the network 110 and the communication links 112, 114. Examples of a video conferencing software application 128 include, without limitation, Microsoft® Skype®, Apple® FaceTime®, or applications available from Zoom® Video Communications, Inc. More generally, however, any video conferencing software application capable of receiving video data and transmitting video data to a remote site can be used, consistent with the functionality described herein. The user device 116 can further include audio speakers (not shown) for generating audio, for example audio of the user(s) speaking in the remote environment R, for the presenter 102 during the video conference.

In some embodiments, for example as shown in FIG. 1, the user device 116 can be used to display video data received from the second video conferencing endpoint 106, on the display 118 (e.g., LED television, OLED television, plasma display) during a video conference. In these embodiments, the user device 116 can communicate with the display 118 using a communication link (not shown). In other embodiments, the user device 116 can include a native display, for example a laptop or tablet that includes a built-in display to enable video from the second video conferencing endpoint 106 to be displayed during the video conference.

The first video conferencing endpoint 104 can further include a communication link (not shown) for enabling communication between the camera device 120 and the user device 116. The communication link may be wired or wireless. In some embodiments, the communication link is a USB communication link selected from the industry standards of USB 2.0, 3.0, and 3.1 having one or more of a combination of type A, B, C, mini-A, mini-B, micro-A, and micro-B plugs.

Figure 2:
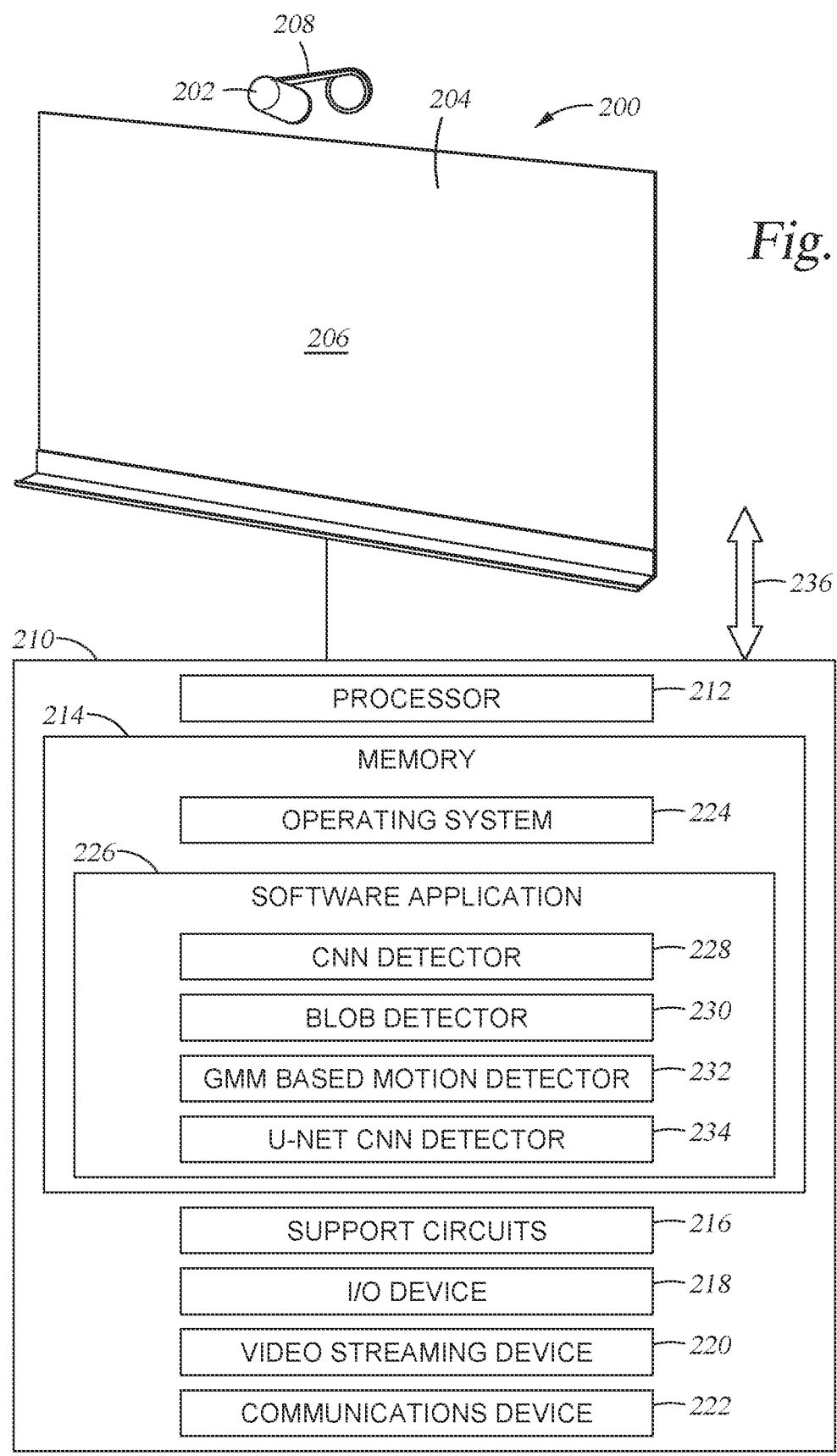
FIG. 2 is a schematic representation of a whiteboard presentation system according to one embodiment.

FIG. 2 is a schematic representation of the whiteboard presentation system 200 shown in FIG. 1 according to one embodiment. The whiteboard presentation system 200 is configured to provide high performance image processing tasks including common image processing routines, such as image denoising, contrast enhancement, and color reconstruction, and additional pattern recognition, segmentation, and classification tasks by machine learning (ML) architectures, such as deep neural networks.

The whiteboard presentation system 200 includes a camera device 202, a whiteboard 204 having a drawing surface 206, and a controller 210. The controller 210 is an electronic device or collection of electronic elements that includes a processor 212, memory 214, support circuits 216, input/output devices 218, a video streaming device 220, and a communications device 222. The processor 212 may be any one or combination of a programmable central processing unit (CPU), a graphics processing unit (GPU), a digital signal processor (DSP), an image signal processor (ISP) that is a specialized DSP used for image processing, a neural network coprocessor, a programmable gate array (FPGA), an application-specific integrated circuit (ASIC), or other hardware implementation(s) suitable for performing the methods set forth herein, or portions thereof. In some embodiments, the controller 210, and its related components, form part of the camera device 202. In this configuration, the camera device 202 will include at least a lens (not shown) and an image sensor (not shown) (e.g., CMOS or CCD sensing elements) that is in communication with the various elements of the controller 210. The image sensor of the camera device 202 may be selected to provide any available resolution, where the resolution is expressed as a horizontal resolution of about 720p, 1080p, 1440p, 3840p (4K), 7680p (8K), or more for a display device having an aspect ratio of about 4:3, 16:9, or 21:9. In some other embodiments, the controller 210 is a standalone system that is configured to directly receive and process video data generated by a camera device 202, and then transmit the processed video data to the user device 116 or directly to the network 110 via a wired or wireless communication link (e.g., Bluetooth® or Wi-Fi).

The memory 214, coupled to the processor 212, is non-transitory computer readable medium and represents any non-volatile type of memory of a size suitable for storing instructions including an operating system (OS) 224, and one or more software applications 226. The one or more software applications 226 can include one or more of deep neural networks, a convolutional neural network (CNN) detector 228, a blob detector 230, a Gaussian mixture model (GMM) based motion detector 232, and a CNN detector 234. The CNN detector 228 is a deep neural network architecture, which applies a filter to an input image to create a feature map that summarizes the presence of detected features in the input image. Repeated application of the same filter to an input image results in a map of activations called a heat map, indicating the locations and strength of a detected feature in an input image. The blob detector 230 is a computer vision algorithm, which detects particularly small objects (referred to as "blobs"). The GMM based motion detector 232 is a computer vision algorithm, which detects moving objects among successive video frames. The CNN detector 234 is a fully convolutional network, which segments an image into regions. The processor 212 may include specialized neural network accelerators (not shown) that are dedicated to running the deep neural networks.

Examples of suitable memory that may be used as the memory 214 include readily available memory devices, such as random access memory (RAM), flash memory, a hard disk, or a combination of different hardware devices configured to store data. In some embodiments, the memory 214 includes memory devices external to the controller 210 and in communication therewith. In some embodiments, the software applications 226 stored in the memory 214 include instructions which when executed by the processor 212 are configured to perform the portions of the methods described herein that are described as being performed by the whiteboard presentation system 200.

The video streaming device 220 is coupled to the processor 212 and is generally used to encode video data acquired from the memory 214 in a desired encoding format and at a desired bitrate. Generally, bitrate describes how much video data a video stream contains where higher resolution, higher frame rates, and lower compression each require an increased bitrate. Typically, the acquired video data is encoded into a desired encoding format, at a desired resolution, and at desired frame rate. The desired resolution may be about 720p, 1080p, 1440p, 3840p (4K), 7680p (8K), or more for a display device having an aspect ratio of about 4:3, 16:9, or 21:9. The desired frame rate is typically greater than about 30 frames per second (fps), and may be within a range from about 30 fps to about 60 fps or more.

Here, the communications device 222, communicatively coupled to the video streaming device 220, delivers the encoded video data to the user device 116 via a communication link 236. The communication link 236 may be wired or wireless, and enables communication between the whiteboard presentation system 200 and the user device 116. In some embodiments, the communication link 236 is a wireless connection, such as Wi-Fi or Bluetooth®. In some embodiments, the communication link 236 is a wired connection, such as a USB connector selected from the industry standards of USB 2.0, 3.0, and 3.1 having one or a combination of type A, B, C, mini-A, mini-B, micro-A, and micro-B plugs.

Figure 3:
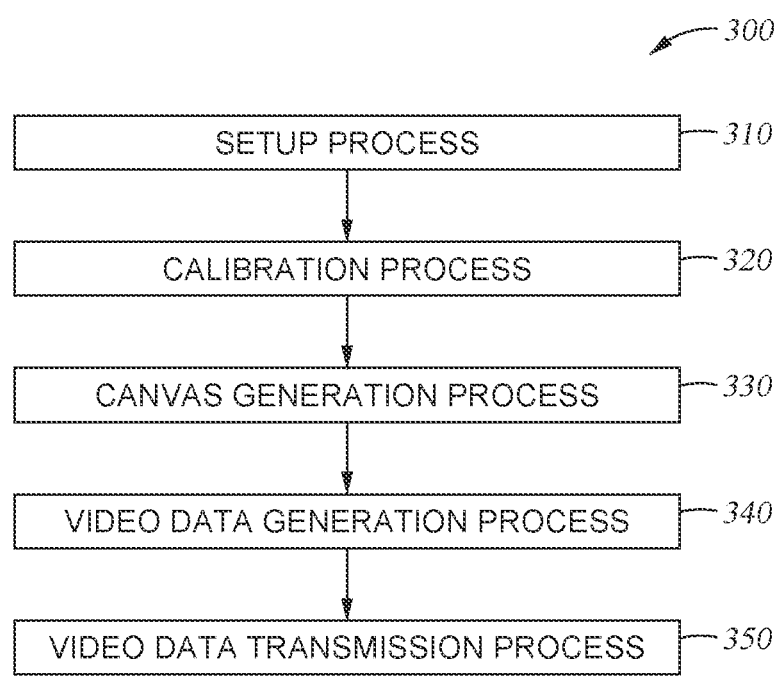
FIG. 3 includes a flowchart illustrating a method of remote whiteboard presentation to be used in a video conference environment according to one embodiment.

FIG. 3 illustrates a method 300 of performing a remote whiteboard presentation that is used in a livestreaming and/or video conference environment, by the whiteboard presentation system 200, according to one or more embodiments of the disclosure provided herein. The methods 300 includes generating and transmitting visible images of the drawing surface 206 of a whiteboard. The generated visible images will include a clean or imperfection-free background without a presenter, shadows, or reflections.

The method 300 starts with block 310 in which an initial setup process is performed, to set up the whiteboard presentation system 200. The whiteboard 204 is mounted on a wall 108 and the camera device 202 is mounted above the whiteboard 204 on the rigid bar 208 that is attached to the wall 108. The camera device 202 is positioned such that the camera device 202 can capture images on the drawing surface 206 of the whiteboard 204. It should be noted that although the whiteboard 204 is mounted on a wall in the example described herein, the whiteboard 204 may be mounted on any other solid and stable surfaces, such as a whiteboard stand or table. After the whiteboard presentation system 200 is assembled and mounted, the whiteboard presentation system 200 begins a calibration process in block 320 in response to instructions received from the controller 210 of the whiteboard presentation system 200 as part of the execution of the software applications 226. In some embodiments, the execution of the software applications 226 begins in response to user input on the user device 116 notifying the whiteboard presentation system 200 to start the software applications 226.

In block 320, a calibration process is performed, to determine size and shape of a canvas on which processed images of the drawing surface 206 of the whiteboard 204 will be rendered in a canvas generation process in block 330. The calibration process includes determining corners of the drawing surface 206 of the whiteboard 204 and manual adjustment of the corners of the drawing surface 206 of the whiteboard 204 if determined necessary by visual check. The processes performed in block 320 are further discussed below.

In block 330, a canvas generation process is performed, to process images of the drawing surface 206 of the whiteboard 204, and render the processed images on a clean canvas. The processing of images of the drawing surface 206 of the whiteboard 204 includes correcting perspective distortion of images of the drawing surface 206 captured by the camera device 202, removing a presenter disposed between the camera device 202 and the whiteboard 204 from the captured images, and altering a background within the captured images, which also includes desirable information, such as writing, notes, drawings, or the like (collectively referred to as "presentation information" hereinafter), that is positioned on the drawing surface 206, to make the presentation information more prominent and complete to a person viewing the captured and transmitted images.

In block 340, a video data generation process is performed, to generate video data by concatenating canvases (i.e., images of the drawing surface 206) generated in block 330 at a desired frame rate. The video data generation process in block 330 further includes detecting when a presenter starts drawing on the drawing surface 206 of the whiteboard 204, which are discussed in further detail below.

In block 350, a video data transmission process is performed, to encode and transmit the video data generated in block 340. The video streaming device 220 coupled to the processor 212 encodes the video data generated in block 330 in a desired encoding format and at a desired bitrate. In some embodiments, the communications device 222 coupled to the video streaming device 220 delivers (e.g., streams) the encoded video data to the user device 116 via the communication link 236. The user device 116 can then transmit the encoded video data to a remote video conferencing endpoint, such as the second video conferencing endpoint 106, using the video conferencing software application 128. Typically, the desired encoding format, bit rates, and/or frame rates of the to-be-transmitted video data are established between the controller 210 and the video conferencing software application 128 of the user device 116 before full communication begins therebetween, e.g., by a handshake protocol. In other embodiments, video data is transmitted to a remote video conferencing endpoint(s) using conventional communication devices and protocols. For example, the video data may be transmitted to a remote video conferencing endpoint using a network interface card, Ethernet card, modem, wireless network hardware and/or other conventional computing device communication hardware.

Figure 4:
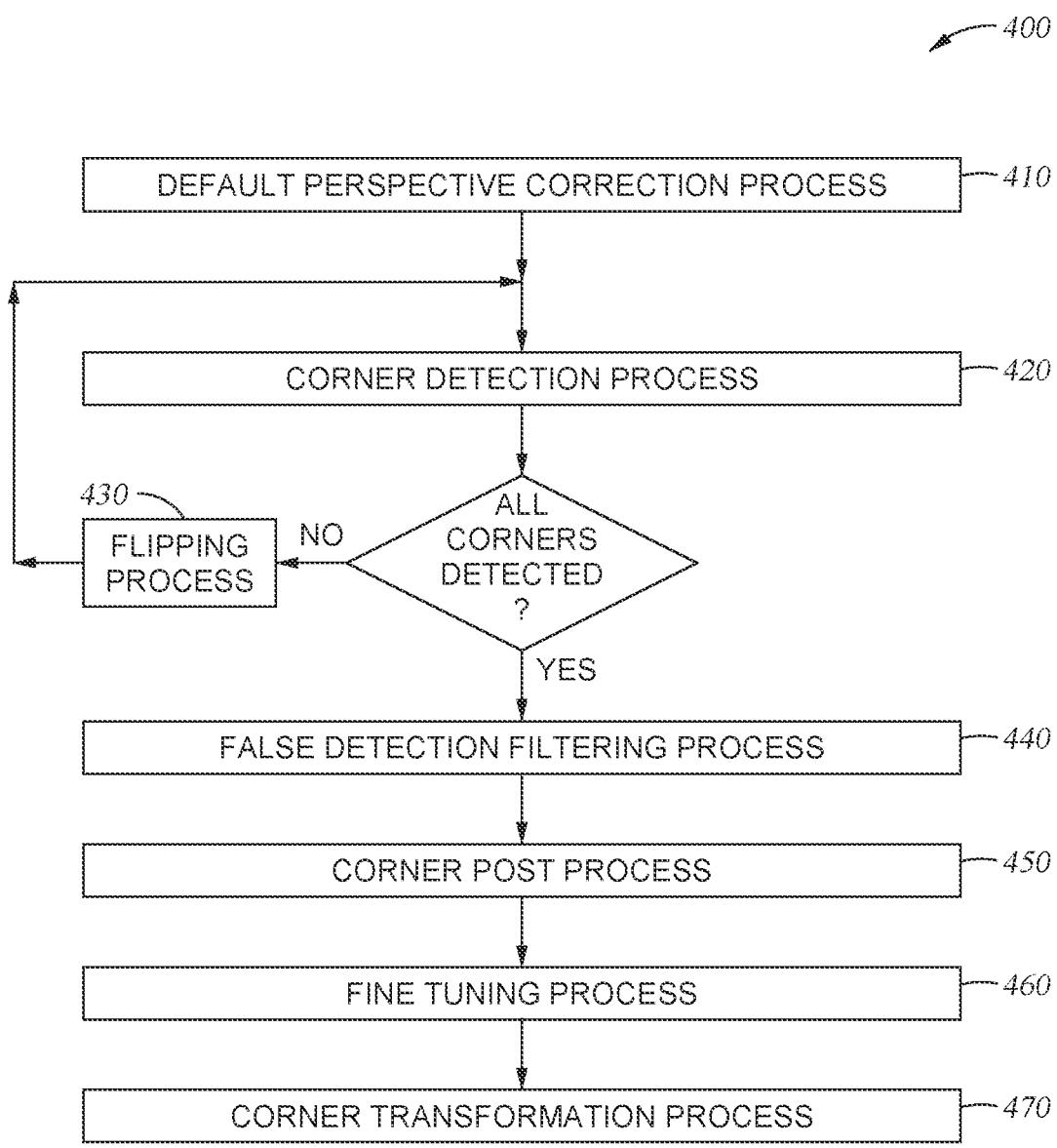
FIG. 4 includes a flowchart illustrating a method for a calibration process according to one embodiment.
Figure 5A:
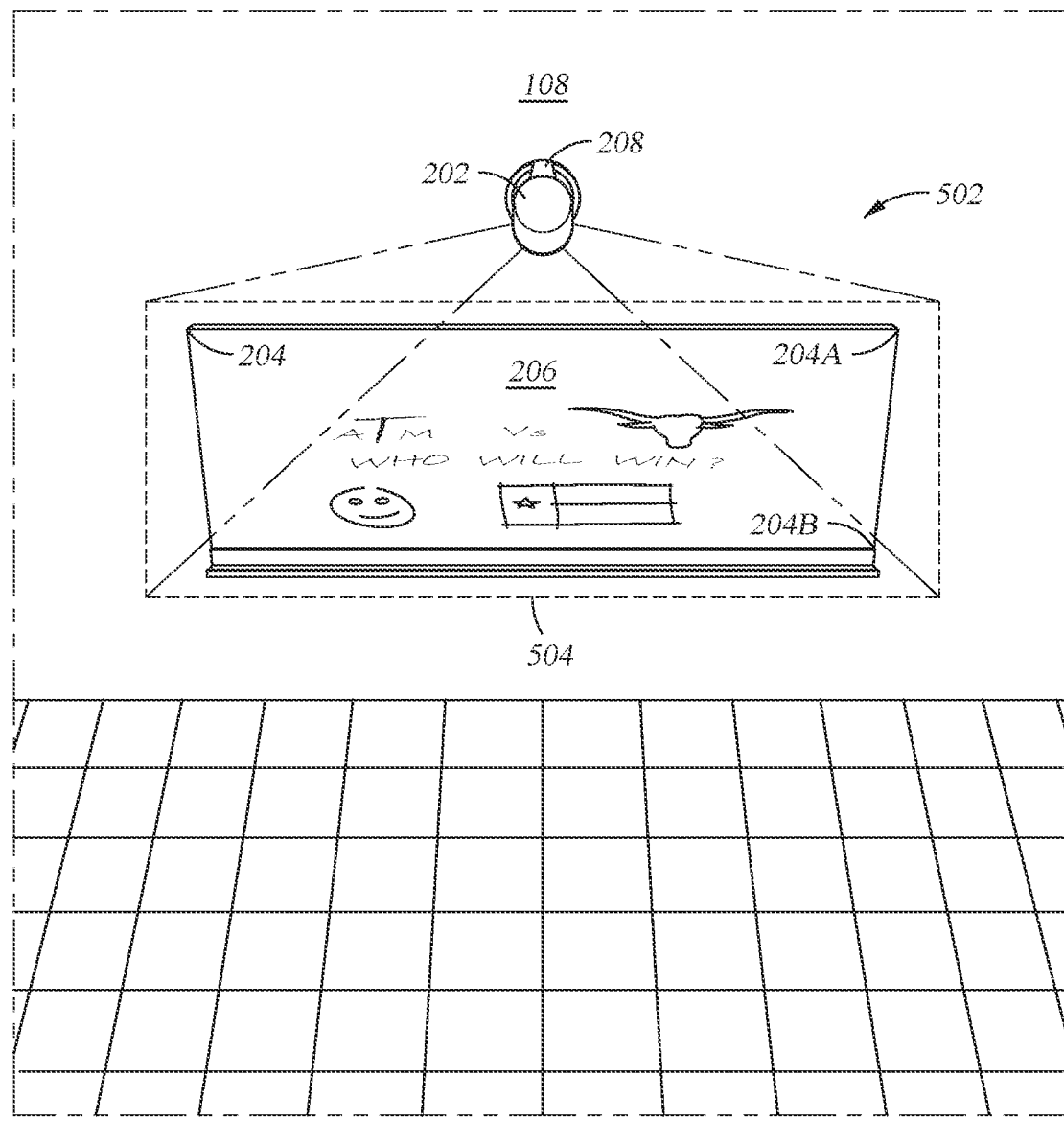
FIGS. 5A and 5B illustrate exemplary images of a whiteboard according to one embodiment.
Figure 5B:
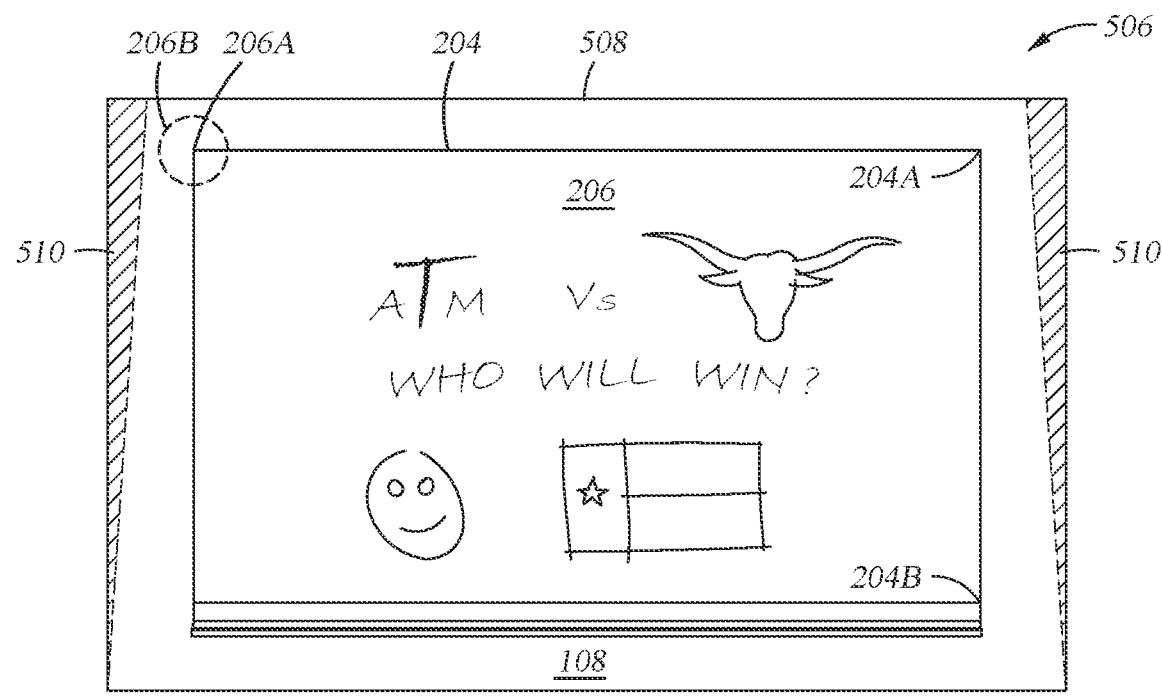

FIG. 4 illustrates a method 400, or calibration process, that is used to determine size and shape of a canvas on which a processed image on the drawing surface 206 of the whiteboard 204 will be rendered, as shown in block 320 above. Generally, at this stage, the drawing surface 206 of the whiteboard 204 can include presentation information left from a previous presentation. FIGS. 5A and 5B illustrate exemplary images of the whiteboard 204 captured by the camera device 202 and a perspective corrected image of the whiteboard 204 by the methods described herein, respectively.

The method 400 starts with block 410, in which a predefined perspective correction process is performed, to correct perspective distortion of an image of the whiteboard 204 captured by the camera device 202. The camera device 202 captures an image 502 of the whiteboard 204, having a visible frame 504, and sends the captured image 502 to the controller 210 of the whiteboard presentation system 200 for the predefined perspective correction. Since the camera device 202 may not be positioned exactly perpendicular to the drawing surface 206 of the whiteboard 204, the image 502 of the whiteboard 204 captured by the camera device 202 may be distorted in that portions 204A of the whiteboard 204 closer to the camera device 202 appear large and portions 204B of the whiteboard 204 farther away from the camera device 202 appear small, as shown in FIG. 5A. In the predefined perspective correction process in block 410, the controller 210 of the whiteboard presentation system 200 generates a perspective corrected image 506 of the whiteboard 204, as shown in FIG. 5B, from the original and distorted image 502 of the whiteboard 204 by a perspective correction technique known in the art (e.g., homography correction technique), as part of the execution of the software applications 226. This predefined perspective correction in block 410 is performed using pre-set locations of corners of the drawing surface 206 of the whiteboard 204 relative to the wall 108, without measuring the locations of the corners of the drawing surface 206 of the whiteboard 204. The perspective corrected image 506 includes the whiteboard 204 that is not distorted (i.e., portions 204A and 204B have the same width) in a distorted visible frame 508. In some embodiments, the perspective corrected image 506 is generated in a rectangular shape by adding pixels in areas 510 outside the visible frame 508. The perspective corrected image 506 of the whiteboard 204 generated in block 410 is stored in the memory 214 of the whiteboard presentation system 200.

In the example described herein, the drawing surface 206 of the whiteboard 204 has four corners each having a 90° angle (i.e., the drawing surface 206 is of a rectangular shape), which allows easier detection of the corners of the drawing surface 206 of the whiteboard 204 and simpler post processing discussed below. However, the methods described herein can be applied to a drawing surface of any other shape.

In block 420, a corner detection process is performed, to detect a location of one corner of the drawing surface of the whiteboard in the perspective corrected image 506. In the corner detection process in block 420, the controller 210 of the whiteboard presentation system 200 executes the convolutional neural network (CNN) detector 228 on the perspective corrected image 506 of the whiteboard 204 generated in block 410 to detect a location of one specific corner 206A (e.g., the upper left corner) of the four corners of the drawing surface 206 of the whiteboard 204. The CNN detector 228 may be trained to detect the one specific corner 206A, as a blob 206B, for example, of a circular shape or simple coordinates of the center. Further, the controller 210 of the whiteboard presentation system 200 executes the blob detector 230 on the perspective corrected image 506 of the whiteboard 204 to extract a location of the center of the blob 206B, which is determined as the location of the one specific corner 260A of the drawing surface 206 of the whiteboard 204. The location of the one specific corner 206A of the drawing surface 206 of the whiteboard 204 detected in block 420 is stored in the memory 214 of the whiteboard presentation system 200.

In block 430, a flipping process is performed, to rotate the perspective corrected image 506. In the flipping process in block 430, the controller 210 of the whiteboard presentation system 200 rotates the perspective corrected image 506 of the whiteboard 204 by a 90° angle, as part of the execution of the software applications 226. In some embodiments, the 90° angle rotation is clockwise. In some other embodiments, the 90° angle rotation is counter-clockwise. The perspective corrected image 506 of the whiteboard 204 flipped in block 430 is stored in the memory 214 of the whiteboard presentation system 200 having corners identified as an upper left corner, an upper right corner, a lower left corner, and a lower right corner.

The method 400 returns to block 420 to detect a location of the one specific corner 206A (e.g., the upper left corner) of the drawing surface 206 of the whiteboard 204 after the perspective corrected image 506 of the whiteboard 204 is flipped in the flipping process in block 430. After the processes in blocks 420 and 430 are repeated, for example, four times (i.e., the locations of all four corners of the drawing surface 206 of the whiteboard 204 have been detected as the one specific corner, e.g., the upper left corner), the method 400 proceeds to block 440.

In block 440, a false detection filtering process is performed, to reject any of the detected locations of the corners of the drawing surface 206 of the whiteboard 204 outside the visible frame 504. In the false detection filtering process in block 440, the controller 210 of the whiteboard presentation system 200 rejects the locations of any of the four corners of the drawing surface 206 of the whiteboard 204 detected in blocks 420 and 430 that are outside or on an edge of the visible frame 508 of the perspective corrected image 506 of the whiteboard 204, or a canvas having an incorrect size or shape, as part of the execution of the software applications 226. This rejection is performed such that a canvas to be generated includes only images on the drawing surface 206 of the whiteboard 204 within the visible frame 504. The locations of the remaining corners of the drawing surface 206 of the whiteboard 204 are stored in the memory 214 of the whiteboard presentation system 200.

In block 450, a corner post process is performed, to determine size and shape of an initial canvas. In the corner post process in block 450, the controller 210 of the whiteboard presentation system 200 determines a canvas of a rectangle shape on which processed images on the drawing surface 206 of the whiteboard 204 will be rendered, from the locations of the corners of the drawing surface 206 of the whiteboard 204 that are detected in blocks 420 and 430, as part of the execution of the software applications 226. In some examples, locations of less than four corners of the drawing surface 206 of the whiteboard 204 are detected, since the locations of corners of the drawing surface 206 of the whiteboard 204 that are outside or on an edge of the visible frame 508 are rejected in block 440, or some corners of the drawing surface 206 of the whiteboard 204 are not detected due to low light, occlusions, or the like. In some other examples, locations of more than four corners of the drawing surface 206 of the whiteboard 204 may be detected, when some corners on a scene, such as furniture, walls, and pictures, are detected as corners of the drawing surface 206 of the whiteboard 204.

In a case where locations of the four corners of the drawing surface 206 of the whiteboard 204 are detected within the visible frame 508 in blocks 420 and 430, the controller 210 of the whiteboard presentation system 200 determines a canvas of a rectangle shape from the four detected locations, and stores the corners of the perspective corrected image of the whiteboard 204 in the memory 214 of the whiteboard presentation system 200. In some embodiments, default lens correction dewarping map is corrected and stored in the memory 214 of the whiteboard 204 and dewarping together with perspective correction are performed on the ISP of the processor 212.

In a case where locations of more than four corners of the drawing surface 206 of the whiteboard 204 are detected within the visible frame 508 in blocks 420 and 430, and subsequently more than one quadrangles are formed, the controller 210 of the whiteboard presentation system 200 scores each of the quadrangles based on a symmetry and a size of each of the formed quadrangle shapes, a size and a form of the blob 206B detected in block 420, generates a canvas of the quadrangle having the highest score, and stores the corners of the perspective corrected image of the whiteboard 204 in the memory 214 of the whiteboard presentation system 200.

In a case where locations of the three corners of the drawing surface 206 of the whiteboard 204 are detected within the visible frame 508 in blocks 420 and 430, the controller 210 of the whiteboard presentation system 200 determines a canvas of a rectangular shape from the detected three corners and a fourth corner that is placed to form a rectangle shape together with the detected three corners, and stores the canvas in the memory 214 of the whiteboard presentation system 200. A post filtering may be applied to the four corners of the drawing surface 206 of the whiteboard 204.

In a case where locations of two corners of the drawing surface 206 of the whiteboard 204 are detected within the visible frame 508 in blocks 420 and 430, for example, when the drawing surface 206 of the whiteboard 204 is longer than a length of the visible frame 508, or when the drawing surface 206 of the whiteboard 204 is wider than a width of the visible frame 508, the controller 210 of the whiteboard presentation system 200 determines a canvas of a rectangular shape from the two detected corners and two corners that are added at an edge of the visible frame 508 to form a rectangular shape together with the two detected corners, and stores the canvas in the memory 214 of the whiteboard presentation system 200.

In a case where no valid detections of corners of the drawing surface 206 of the whiteboard 204 are obtained, the controller 210 of the whiteboard presentation system 200 determines a canvas of a rectangular shape using predefined locations of the corners of the drawing surface 206 of the whiteboard 204 stored in the memory 214 of the whiteboard presentation system 200, and used in the whiteboard presentation system 200. The predefined locations of the corners of the drawing surface 206 of the whiteboard 204 may form a maximum region of the drawing surface 206 of the whiteboard 204, for example, having a length of 6 feet and a width of 4 feet.

In block 460, a fine tuning process is performed, to accurately determine the location of the center of the corners. The corners of the drawing surface 206 of the whiteboard 204 detected in blocks 420 and 430 may have been detected on a downscaled image, and thus the location of the center of the corners may have not been determined accurately. Thus, in the fine tuning process in block 460, the controller 210 of the whiteboard presentation system 200 executes the CNN detector 238 on cropped and upscaled corner regions again. The controller 210 of the whiteboard presentation system 200 determines the location of the center of the corners, and stores the location of the center of the corners in the memory 214 of the whiteboard presentation system 200.

In block 470, a corner transformation process is performed, to transform the determined locations of the corners of the drawing surface 206 of the whiteboard 204 to coordinates of the canvas. In the corner transformation process in block 470, the controller 210 of the whiteboard presentation system 200 transforms the detected locations of the corners of the drawing surface 206 of the whiteboard 204 to coordinates of the canvas, as part of the execution of the software applications 226, and stores the coordinates of the canvas in the memory 214 of the whiteboard presentation system 200.

Canvas Generation Process(es)

Figure 6:
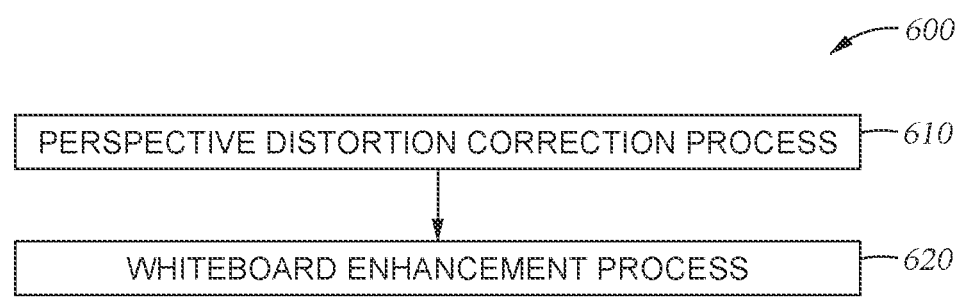
FIG. 6 includes a flowchart illustrating a method of a canvas generation process according to one embodiment.
Figure 7A:
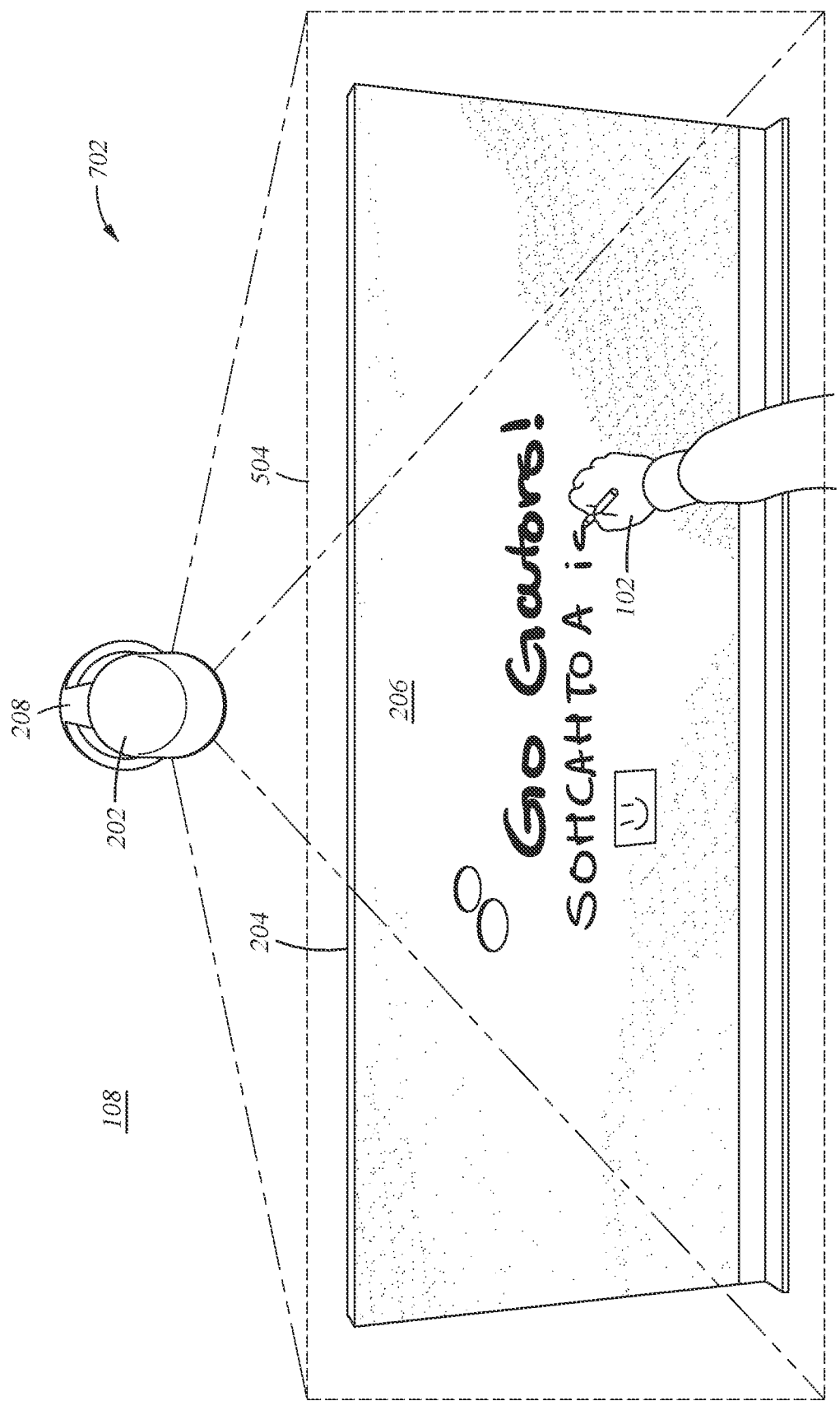
FIGS. 7A and 7B illustrate exemplary images of a whiteboard according to one embodiment.
Figure 7B:
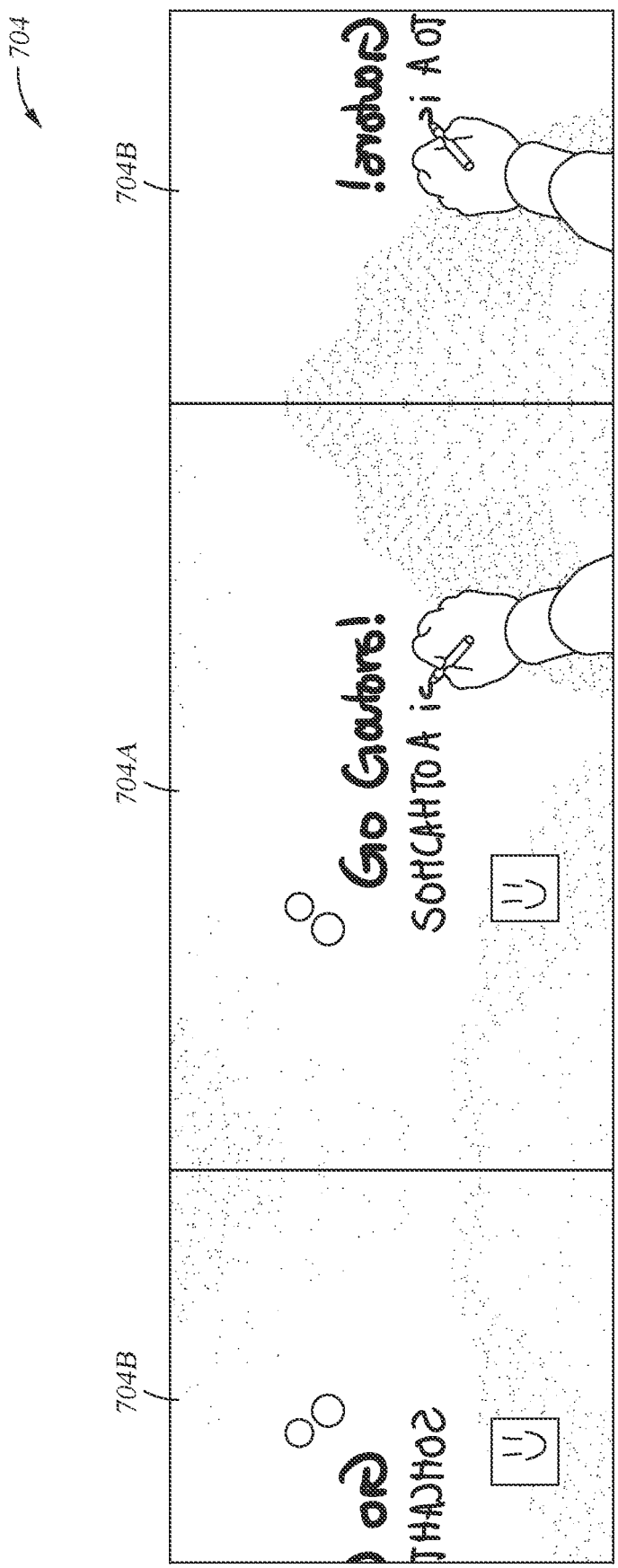

FIG. 6 illustrates a flowchart illustrating a method 600 of the canvas generation process, to process an image of the drawing surface 206 of the whiteboard 204, render the processed image on the canvas determined in block 320, as shown in block 330. FIG. 7A illustrates a view of the whiteboard 204 from a perspective similar to the perspective of images that are formed by the camera device 202. FIG. 7B is a perspective corrected and padded image of the whiteboard 204 formed by the methods described herein, respectively.

The method 600 starts with block 610, in which a perspective distortion correction process is performed, to correct perspective distortion of an image of the whiteboard 204 captured by the camera device 202. The camera device 202 captures an image 702 of the whiteboard 204 having drawing thereon, as shown in FIG. 7A, to be processed, and send the captured image 702 to the controller 210 of the whiteboard presentation system 200 for the perspective correction. In the perspective distortion correction process in block 610, the controller 210 of the whiteboard presentation system 200 generates a perspective corrected image 704 of the whiteboard 204, as shown in FIG. 7B, from the original distorted image 702 of the whiteboard 204, as part of the execution of the software applications 226. This perspective distortion correction process in block 610 is performed using the coordinates of the four corners of the canvas stored in the memory 214 of the whiteboard presentation system 200 in block 470. The perspective corrected image 704 of the whiteboard 204 may include a portion 704A that is a perspective corrected image of the drawing surface 206 of the whiteboard 204 and portions 704B that are padded (i.e., mirrored images of the portion 704A are added to both sides of the portion 704A). The controller 210 stores the perspective corrected image 704 in the memory 214 of the whiteboard presentation system 200.

It should be noted that the perspective distortion correction process in block 610 may involve image interpolation that degrades sharpness in the perspective corrected image 704. In some embodiments, the perspective distortion correction process in block 610 is performed on an IPS of the processor 212 for accelerating the image processing and improving the image quality. The perspective distortion correction process in block 610 may be combined with lens distortion correction of the camera device 202.

In block 620, a whiteboard enhancement process is performed, to remove a presenter from the perspective corrected image 704 of the whiteboard 204 and remove imperfections (e.g., shadows, reflections, and markers' smears) in the images captured by the camera device 202. In the whiteboard enhancement process in block 620, the controller 210 executes the software applications 226 on the perspective corrected image 704 of the whiteboard 204 to segment (i.e., remove) a presenter 102 from the perspective corrected image 704, render drawings and notes by the presenter 102 on a canvas having a clean white background, and detect when the presenter starts drawing and adding notes on the drawing surface 206 of the whiteboard 204. The whiteboard enhancement process in block 620 is performed at an output frame rate, for example, 2 FPS (frames per second). That is, the canvas is generated and updated as a new frame twice per second. The processes performed in block 620 are further discussed below.

Figure 8:
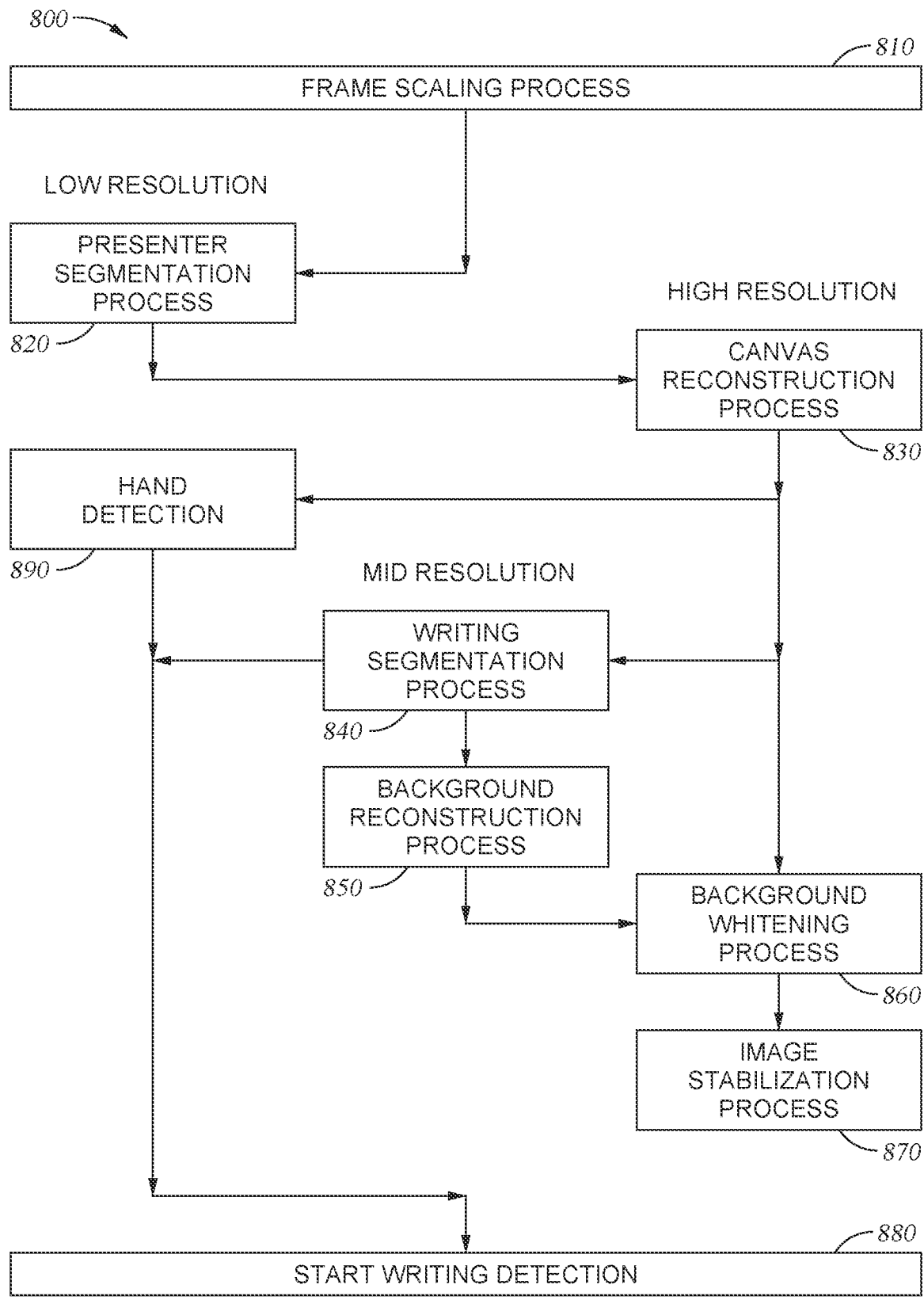
FIG. 8 includes a flowchart illustrating a whiteboard enhancement process according to one embodiment.

FIG. 8 illustrates a method 800 of the whiteboard enhancement process illustrated in block 620. FIGS. 9A, 9B, 9C, 9D, and 9F illustrate images of the whiteboard 204 at various states of the method 800.

In some embodiments, the whiteboard enhance process in block 620 includes machine learning (ML) and computer vision (CV) in canvas processing (CP) processes that are split into multi-resolution levels, such as three resolution levels that include a high resolution level, a mid resolution level, and a low resolution level, to optimize processing performance. At the high resolution level, light CP processes are performed per pixel at an original pixel resolution (e.g., 1080p), for example, generated by the image sensor of the camera device 202. In the mid resolution level, heavier CP processes are performed. In the low resolution process, heaviest CP processes are performed. The whiteboard enhancement process performed in block 620, which uses multiple-resolution levels, is believed to provide significant advantages for systems that are for one reason or another limited by computing power, since the techniques described herein allow processes, which do not necessarily require the use of high resolution image data, to be performed more rapidly using lower resolution image data. The processes described herein will thus decrease latency of the processed and then transmitted images due to the decreased processing time over conventional single level resolution processing techniques. The use of the whiteboard enhancement process techniques described herein will also reduce the material cost of the camera device 202, in configurations where the controller 210 forms part of the camera device 202, or the cost of the controller 210 in configurations where the controller 210 is a stand-alone device, due to the reduced need for more expensive processors (e.g., DSP, CPUs, and/or GPUs) to perform the processing methods described herein.

Figure 9A:
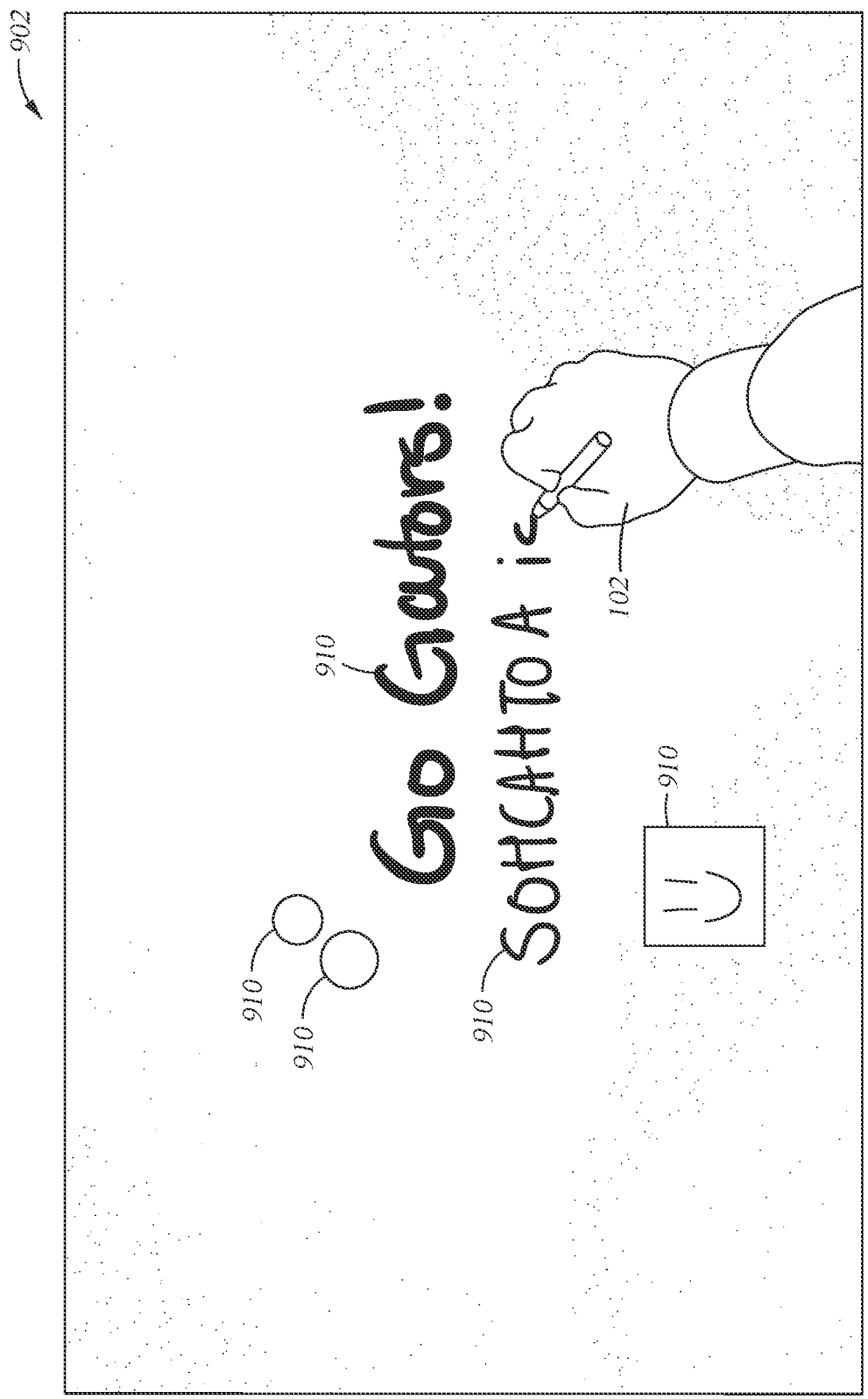
FIGS. 9A, 9B, 9C, 9D, and 9F illustrate exemplary images of a whiteboard according to one embodiment.

The method 800 starts with block 810, in which a frame scaling process is performed, to scale a perspective corrected image of the whiteboard 204. In the frame scaling process in block 810, the controller 210 of the whiteboard presentation system 200 scales a perspective corrected image 902, as shown in FIG. 9A, to an appropriate predetermined size, for example, three times or four times reduction, as part of the execution of the software applications 226. The scaled perspective corrected image 902 is stored in the memory 214 of the whiteboard presentation system 200.

In block 820, a presenter segmentation process is performed, to detect a presenter or portion thereof (e.g., presenter's appendage) in the perspective corrected image 902 of the whiteboard 204. For ease of discussion, the term presenter 102 as used herein is intended to broadly describe at least one of the presenter's body, a portion of a presenter's appendage and elements attached to or held by the presenter (e.g., pen, watch, eraser, or hat). The presenter segmentation process in block 820 may be performed using an image that is formed at the low resolution level. The low resolution level can be achieved by use of a downsampling processing of a higher resolution image generated by the image sensor of the camera device 202, and thus downsampling is at least one technique by which a low resolution image can be derived from a high resolution image. In one example, the resolution of a higher resolution image (e.g., 1080p image) is reduced by at least two times, three times, or four times, eight times or even 16 times by downsampling to form the low resolution level image.

Figure 9B:
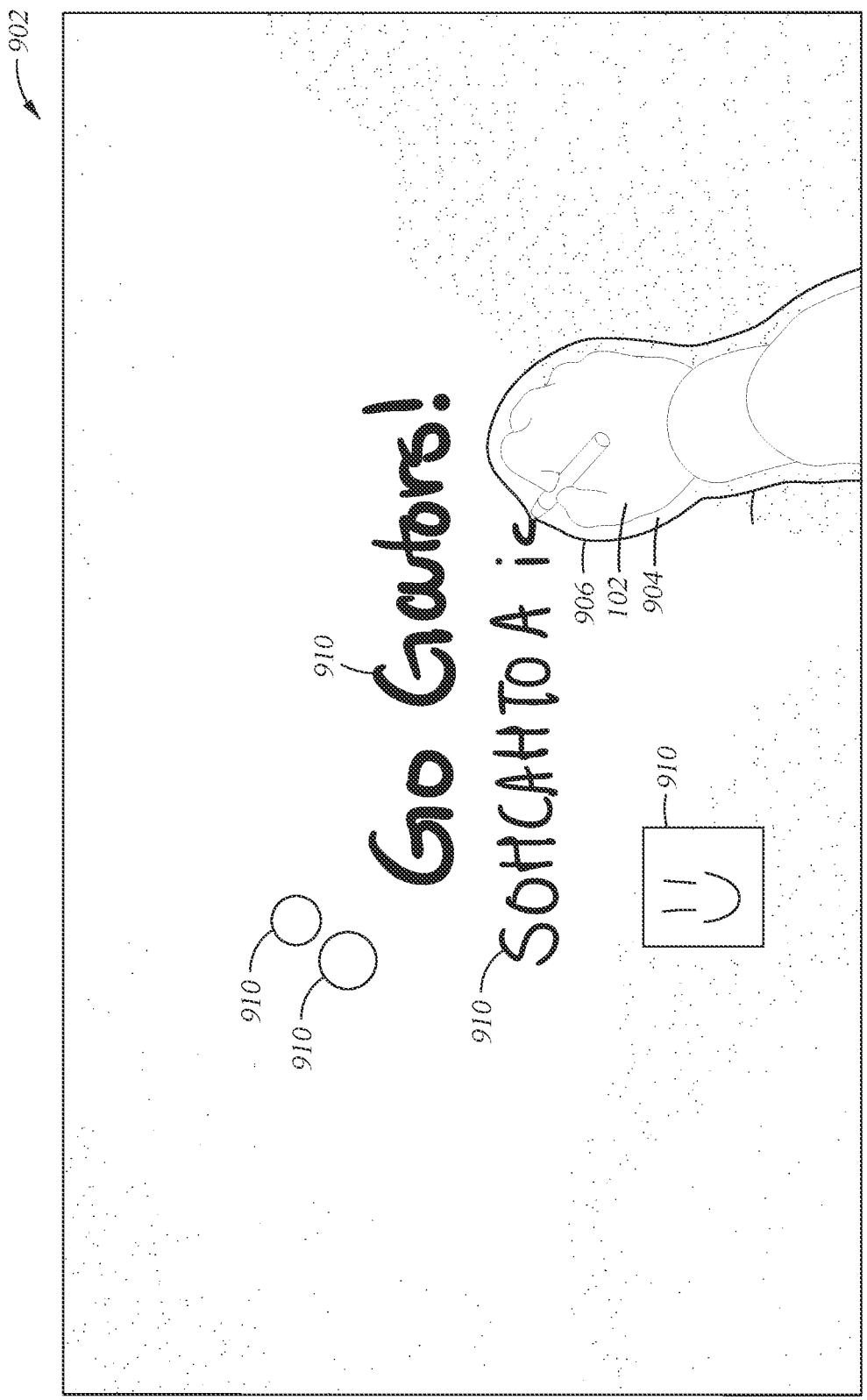

In the presenter segmentation process in block 820, the controller 210 of the whiteboard presentation system 200 executes the CNN detector 228 on the scaled perspective corrected image 902 to detect a presenter 102. The controller 210 of the whiteboard presentation system 200 further generates a presenter mask 904, as shown in FIG. 9B where the presenter 102 is detected, as part of the execution of the software applications 226. The presenter mask 904 separates the scaled perspective corrected image 902 into pixels obstructed by the presenter 102 and the remaining pixels not obstructed by the presenter 102. The presenter mask 904 will include pixels within an exclusion region (also referred to as a "presenter mask region") that includes the portion of the presenter 102 obstructing the drawing surface 206 and edges 906 that surround the portion of the presenter 102. In some embodiments, the edges 906 are positioned a fixed distance from the detected outline of the portion of the presenter 102 positioned over the drawing surface 206. In one embodiment, the distance that the edges 906 are set from the outline of the presenter 102 is such that a significant gap is formed around the actual outline of the presenter 102 to avoid the presenter mask 904 including any convoluted shapes that would be formed around the presenter 102 if the edges 906 were positioned close to the actual outline of the presenter 102 (e.g., positioned close enough to detect gaps between fingers). In some embodiments, the presenter mask 904 may be built with edges 906 that are intentionally blurred or smoothed. For example, edges 906 of the presenter mask 904 may be generated by gradually upscaling and blurring or smoothing edges of the outline of the presenter 102 detected by the CNN detector 228 with a small Gaussian blur kernel.

In some embodiments, the controller 210 of the whiteboard presentation system 200 executes the GMM based motion detector 232 to perform a secondary presenter segmentation process, to compensate for failures of the primary presenter segmentation process by the CNN detector 228, for example, when a presenter 102 moves fast. The GMM based motion detector 232 detects only pixels that are obstructed by the presenter 102 and presenter mask 904 but not pixels that are uncovered. In some embodiments, the controller 210 may generate the presenter mask 904 using the generated medium pixel resolution level images during the completion of the presenter segmentation process discussed in relation to block 820. The controller 210 of the whiteboard presentation system 200 stores the presenter mask 904 in the memory 214 of the whiteboard presentation system 200

Figure 9C:
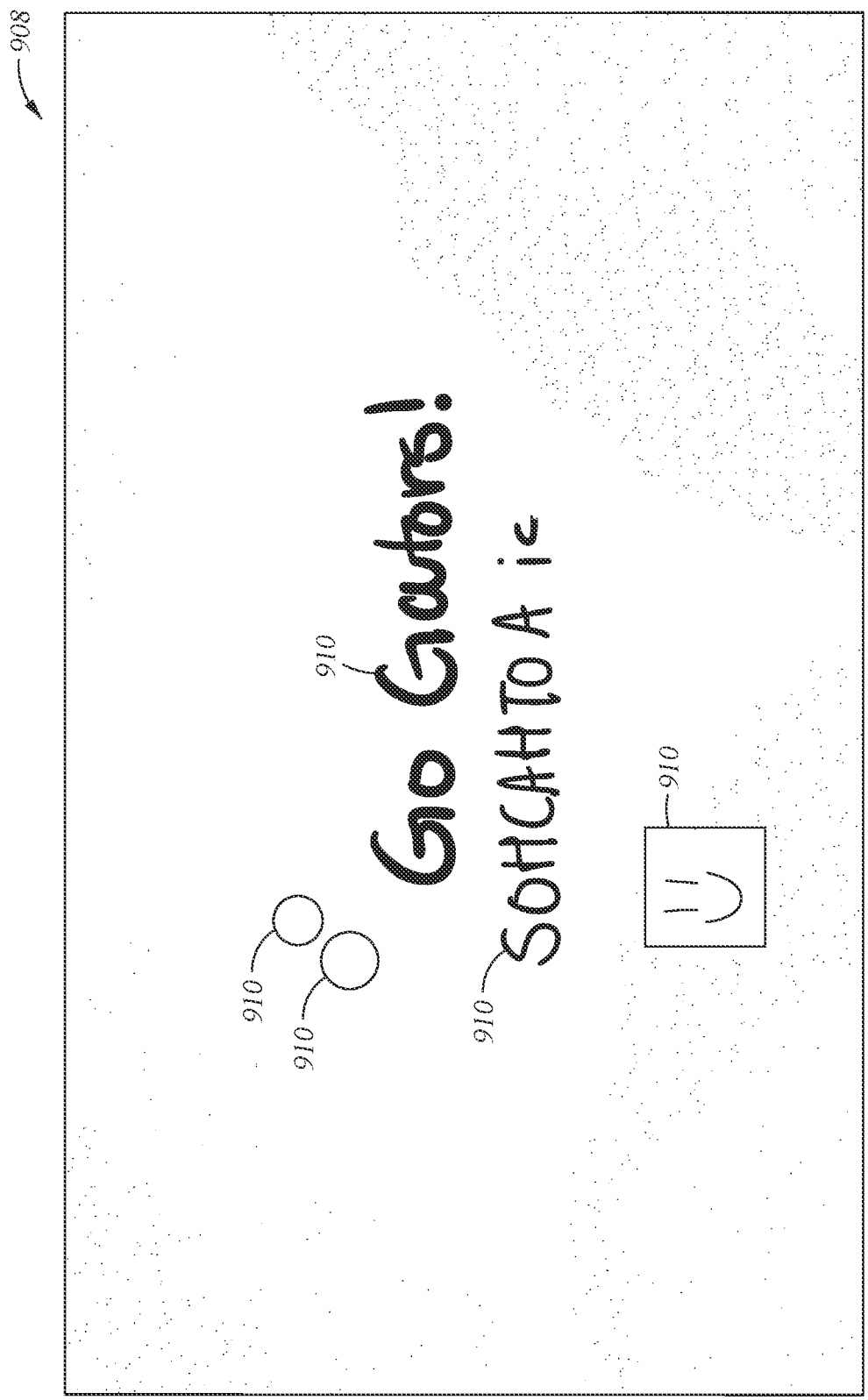

In block 830, as shown in FIG. 9C, a canvas reconstruction process is performed to render the scaled perspective corrected image 902 with the presenter mask 904 portion removed on the canvas determined in block 320, after the presenter segmentation process in block 820 is performed. The canvas reconstruction process in block 830 may be performed at the medium resolution level, or resolution level of the images (i.e., frames) received from the image sensor of the camera device 202. In the canvas reconstruction process in block 830, the controller 210 of the whiteboard presentation system 200 applies the presenter mask 904 to the scaled perspective corrected image 902 to determine pixels that are disposed outside the presenter mask region, renders the pixels in the scaled perspective corrected image 902 that are disposed outside the presenter mask region, and replaces the pixels in the scaled perspective corrected image 902 that are disposed within the presenter mask region with the corresponding pixels in the canvas from a previous frame to render on the canvas determined in block 320 to generate a reconstructed canvas 908, as shown in FIG. 9C, as part of the execution of the software applications 226. The process of replacing the portion of the whiteboard 204 covered by the presenter mask 904 with corresponding pixels is also referred to herein as "blending." In some embodiments, the presenter mask 904 of the original pixel resolution is used to replace the pixels obstructed by the presenter mask 904. In some embodiments, the controller 210 generates the canvas 908 by blending (known as "alpha blending" or "alpha compositing" in the art) the masked pixels with the remaining pixels from the previous frame (i.e., a background) using a heatmap of the presenter mask 904 as an alpha blending coefficient. The reconstructed canvas is then stored in the memory 214 of the whiteboard presentation system 200. The canvas 908 generated in the canvas reconstruction process in block 830 may contain unwanted elements, such as shadows, reflections, markers' smear, or the like, which cannot be attributed to a whiteboard obscuring portion of a presenter 102 (e.g., physical body part). This formed canvas 908 can then be used to remove these unwanted whiteboard content obscuring elements by use of the following processes 840, 850, and 860.

In block 840, a presentation information segmentation process is performed, to assign image pixels with writing, drawings and notes (i.e., hereafter presentation information 910), such as lines generated by an erasable marker or a colorful Post-It, positioned on or drawn on the drawing surface 206 of the whiteboard 204, and remove the assigned image pixels after the canvas reconstruction process in block 830 is performed. The presentation information segmentation process in block 840 may be performed at the mid-resolution level. The medium resolution level can be achieved by use of a downsampling process of a higher resolution image generated by the image sensor of the camera device 202, and thus a medium resolution level image can be derived from a high resolution level image. In one embodiment, the resolution of the mid-resolution level is in between the higher resolution of the images (e.g., 1080p images) received from the image sensor of the camera device 202 and a low resolution level, such as the low resolution level used in the presenter segmentation process described above. In one example, the resolution of a higher resolution image (e.g., 1080p image) is reduced by at least two times, three times, or four times by downsampling to form the mid-resolution level image. The use of the mid-resolution level images will reduce the processing time required to perform the operations performed during block 840 versus using high resolution images during this process, while allowing the extents of the presentation information 910 that will be defined by this process to have clearly defined edges.

Figure 9D:
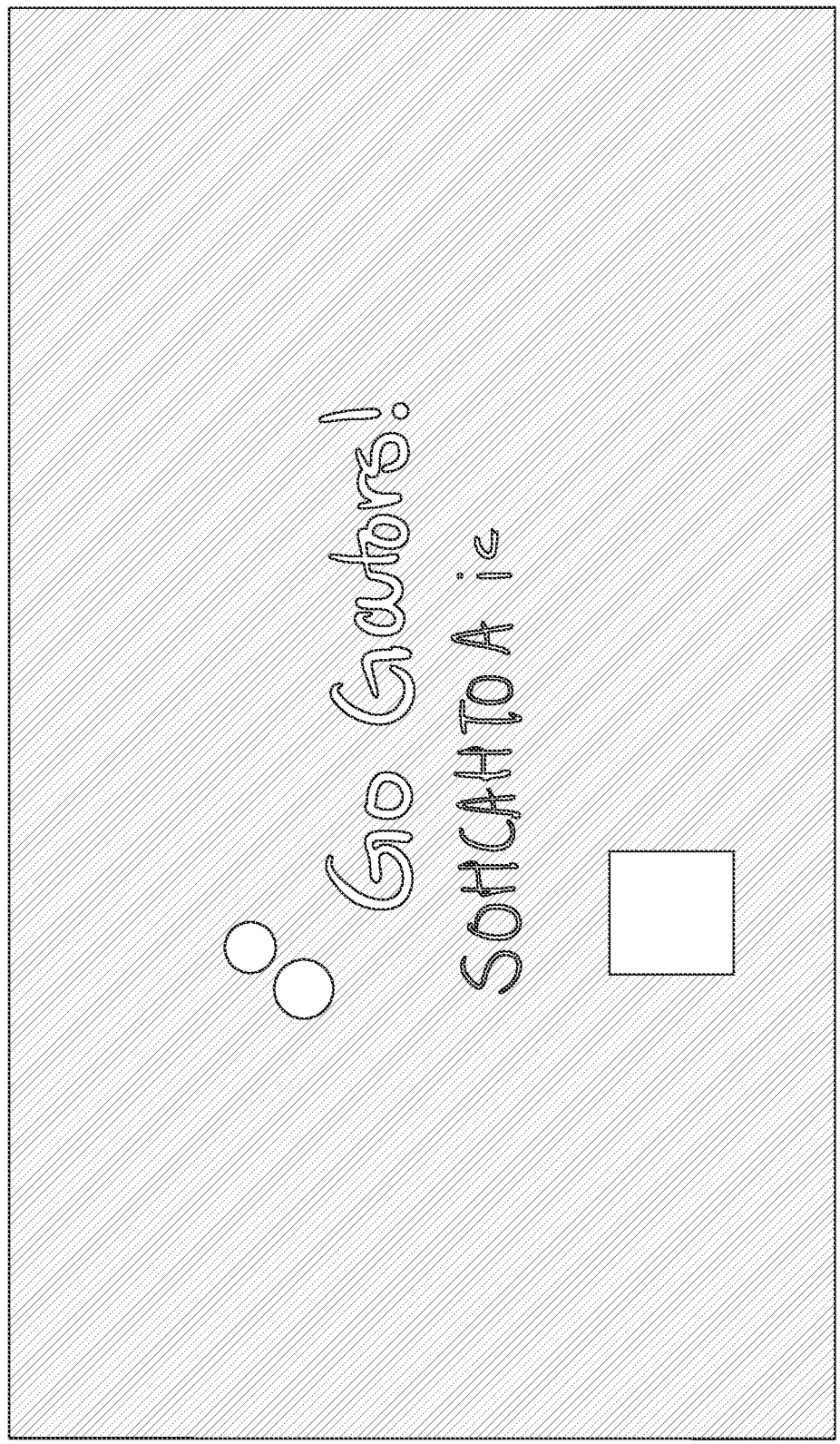

In the presentation information segmentation process in block 840, the controller 210 executes the CNN detector 234 on the canvas 908 stored in the memory 214 of the whiteboard presentation system 200 in block 830 to detect presentation information 910 on the drawing surface 206 of the whiteboard 204 in the canvas 908. The controller 210 of the whiteboard presentation system 200 further generates a presentation information 912 where the presentation information 910 are detected, as shown in FIG. 9D, as part of the execution of the software applications 226. The presentation information mask 912 generated here separates the canvas 908 into pixels containing portions of the presentation information 910 and the remaining pixels not containing portions of the presentation information 910. In some embodiments, the presentation information mask 912 includes the pixels that contain portions of the presentation information 910, such as the "white regions" in FIG. 9D. In an alternate embodiment, the presentation information mask 912 includes the pixels that do not include portions of the presentation information 910, such as the "black regions" in FIG. 9D, which is a negative version of the "white regions." The presentation information mask 912 may alternately be generated at the original pixel resolution (e.g., 1080p) to be used in the background reconstruction process in block 850. The controller 210 of the whiteboard presentation system 200 stores the presentation information mask 912 in the memory 214 of the whiteboard system.

Figure 9E:
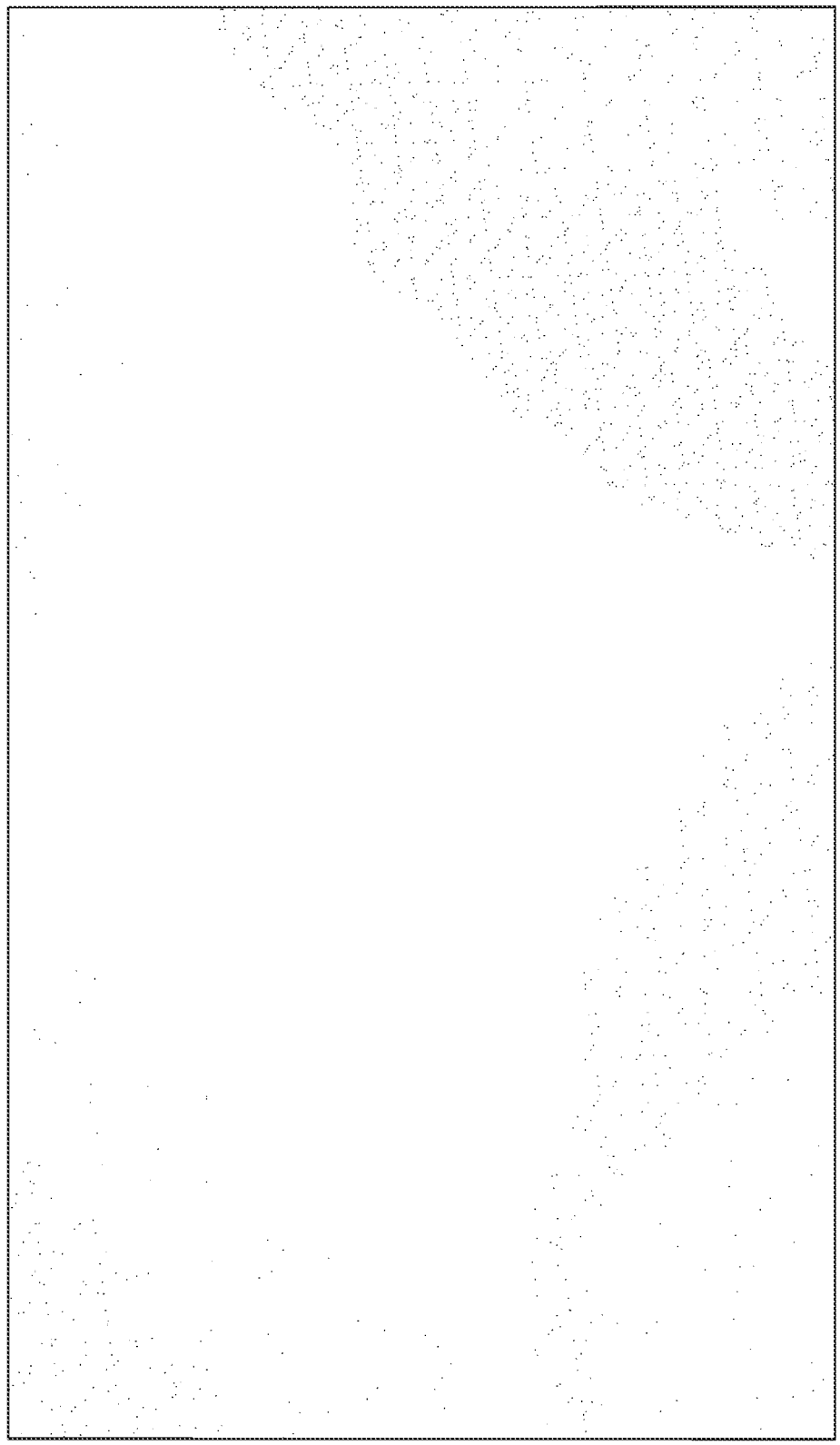
FIG. 9E illustrates a reconstructed background of the whiteboard illustrated in FIG. 9A according to one or more embodiments.

In block 850, a background reconstruction process is performed, to generate a canvas background 914 with the portion of the presenter 102 and the presentation information 910 removed, as shown in FIG. 9E, after the presentation information segmentation process in block 840 is performed. At the end of the background reconstruction process the canvas background 914 will include the one or more background imperfections, such as shadows and reflections, which are described above. The background reconstruction process may be performed at the mid resolution level. In one embodiment, to remove the presentation information 910 from the canvas 908, a copy of the canvas 908, excluding the pixels that are covered by the presentation information mask 912 (i.e., "white regions" in FIG. 9D are excluded), is generated and the canvas background 914 only including the imperfections, but not the presentation information 910, is reconstructed from the copy of the canvas 908. The copy of the canvas 908 has holes corresponding to the pixels that are covered by the presentation information mask 912 (e.g., "white regions" in FIG. 9D), and these holes are in-painted by neighboring pixels. To in-paint the holes in the copy of the canvas 908, the controller 210 of the whiteboard presentation system 200 performs an edge filling operation and a linear in-painting operation on the copy of the canvas 908, as part of the execution of the software applications 226. In some embodiments, an interpolation technique (e.g., bilinear, bicubic) can be used to perform the in-painting operation, so that an intensity value can be determined for each pixel of the canvas 908.

In some examples, the presentation information 910 are positioned near an edge of the visible frame 508, and thus there are no corresponding pixels in copy of the canvas 908, leaving holes on edges of the copy of the canvas 908. The controller 210 of the whiteboard presentation system 200 can fill holes on edges of the canvas background with values estimated by the edge filling techniques known in the art, as part of the execution of the software applications 226.

The controller 210 of the whiteboard presentation system 200 stores the canvas background 914, which only includes the various detected imperfections contained in the image of the drawing surface 206 after removing the portion of the presenter 102 and the presentation information 910, in the memory 214 of the whiteboard presentation system 200.

Figure 9F:
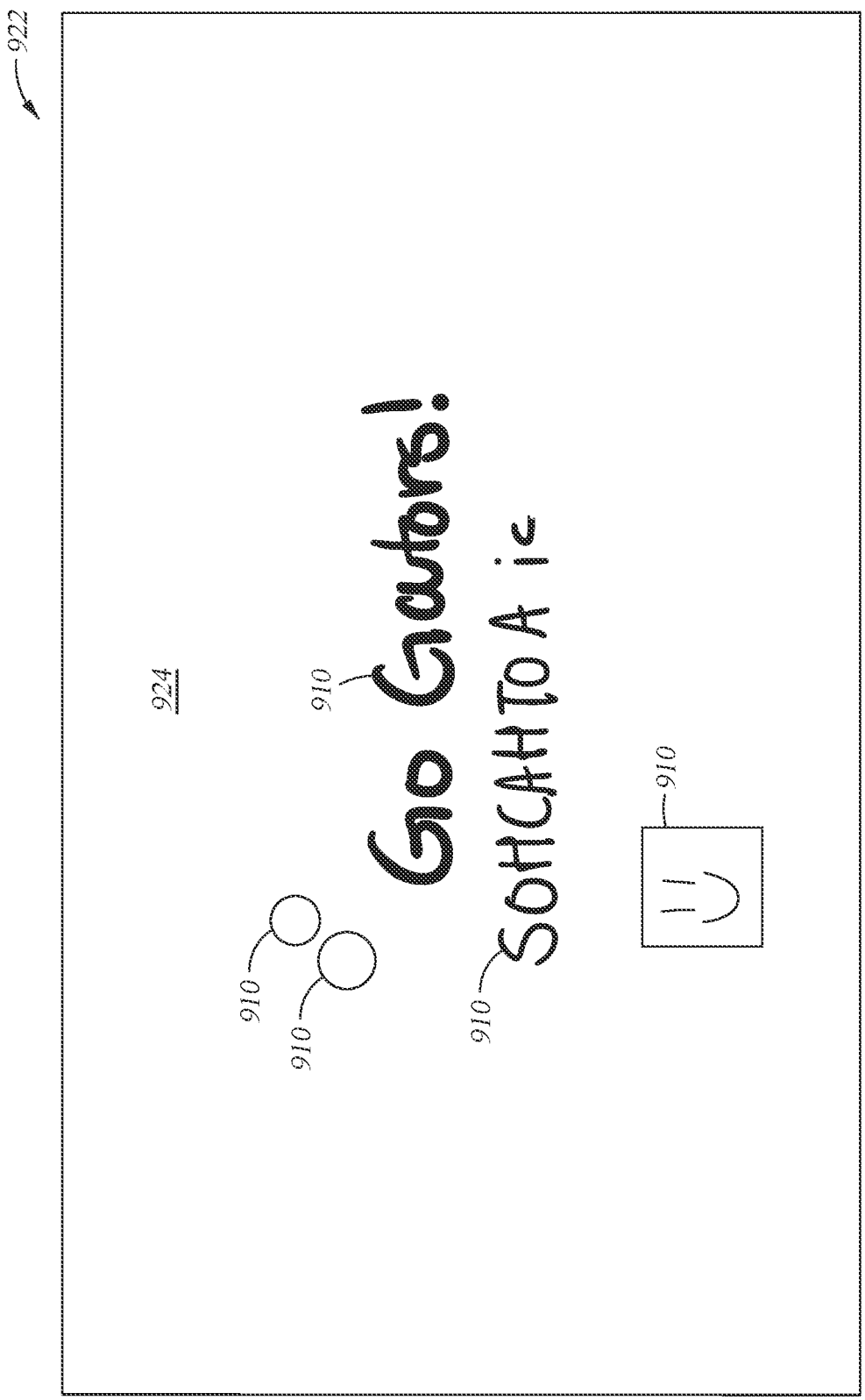

In block 860, a background "bleaching" process is performed, which removes the detected imperfections found in the canvas background 914 and thus allows the presentation information 910 to be rendered on a bleached canvas background 924. The background bleaching process may be performed at the high resolution level. The controller 210 of the whiteboard presentation system 200 generates a canvas 922 having a bleached canvas background 924 and the presentation information 910 is rendered on the bleached canvas background 924, as shown in FIG. 9F, as part of the execution of the software applications 226. The canvas 922 with the bleached canvas background 924 is generated by dividing each pixel in the canvas 908 by its equivalent pixel in the canvas background 924. In one example, each pixel RGB (red, green, blue) value of the canvas 922 is divided by each pixel RGB value of the canvas background 914 to form the bleached canvas background 924. For example, if an RGB pixel value of the canvas 922 is 1 (e.g., "white") and the corresponding pixel value of the canvas background 914 is 1 (e.g., "white"), the division will equal 1 (e.g., "white"). In another example, if a pixel RGB value of the canvas 922 and the corresponding pixel value of the canvas background 914 are both 0.9, the division process will also yield a value of 1 (e.g., "white") for that pixel. Thus, the canvas background 914 provides a division coefficient for each pixel RGB value in the canvas 922 that, by use of the division process, lifts the pixel RGB values in the background to a value near 1, which can be associated with a desired color such as "white." Thus, the background (i.e., everything around the presentation information 910) will be divided by itself making the pixel value 1 (e.g., "white") and thus "bleached." With respect to the presentation information 910, for example, a pixel value in the canvas 922 may be 0.4 and the corresponding pixel value in the canvas background 914 may be 0.9, and thus the division is 0.4/0.9=0.44. Thus, the presentation information 910 becomes slightly brighter, but also closer in color to a value of 1 and thus tending to "bleach" the pixel's RGB value. In some embodiments, the pixel values for red, green, and blue channels are processed separately and thus colors are maintained after performing this background bleaching process. The background bleaching process will thus remove the imperfections found in the canvas 908, and make the background have a single monotone color and intensity. In some embodiments, gamma correction might be applied after bleaching to make contextual information more vivid colored.

In one aspect of the background bleaching process, the color and/or intensity of the high resolution image pixels identified as being part of the presentation information 910 may be adjusted to correct for the alteration of the original pixels found in the perspective corrected image 902, due to the combining of the related pixels formed in the canvas background 914, during the canvas reconstruction process 830 and the background reconstruction process 850, from the same pixel locations found in the perspective corrected image 902. The alteration of the color and/or intensity values of the high resolution image pixels found within the presentation information mask 912 regions (e.g., "white regions") can be amplified by use of a gamma correction process.

In block 870, an image stabilization process is performed, to compensate errors in the presentation information segmentation process in block 840, the background reconstruction process in block 850, and the background bleaching process 860. The image stabilization process in block 870 may be performed at the high resolution level. In the image stabilization process in block 870, the controller 210 of the whiteboard presentation system 200 analyzes data stored in the memory 214 of the whiteboard presentation system 200 with respect to a history of detections of a presenter 102, and computes an appropriate rate of updating the canvas, as part of the execution of the software application 226. For example, when a presenter 102 has not been detected recently, the canvas is updated at a slower rate. Furthermore, since no changes in the presentation information 910 are expected when a presenter 102 is not detected, this process compensates instability (e.g., flickering or varying pixel intensities, whiteboard shaking, camera shaking) in the presentation information segmentation process in block 840, the background reconstruction process 850, and the background bleaching process 860. In such cases, the bleached canvas background 924 from the previous frame is blended with the current bleached canvas background 924, taking mainly from the previous bleached canvas background.

In block 880, a start-presentation detection (auto-share) process is performed. The start-presentation detection process in block 880 may be performed at the mid resolution level. In the start-presentation detection process in block 880, the controller 210 of the whiteboard presentation system 200 detects when a presenter 102 starts drawing on the drawing surface 206 of the whiteboard 204 and sends notification data to the user device 116. The user device 116 then triggers the video conferencing software application 128 to notify users of a start of the presentation information detection process on the drawing surface 206 of the whiteboard 204, if such "auto-share" features are enabled in the video conferencing software application 128. If a presenter 102 starts drawing on the drawing surface 206 the whiteboard presentation system 200 can then begin to stream images of the drawing surface 206 to the user device 116 or directly to the network 110.

In block 890, a hand detection process is performed to stabilize the auto-share process in block 880. In the hand detection process in block 890, the controller 210 of the whiteboard presentation system 200 executes the CNN detector 238 to detect the hand of the presenter 102. The detection of the hand of the presenter allows determination of the presentation information 912 that is being drawn or made.

FIG. 10 illustrates a method 1000, or video data generation process, that is used to generate video data by concatenating canvases generated in the canvas generation process in block 330 at a desired frame rate, illustrated in block 340.

The method 1000 starts with block 1010, in which a frame interpolation process is performed, to generate video data at a desired frame rate that is higher than an output frame rate of the canvas generation process in block 320. In some examples, the desired frame rate may be 15 FPS. To increase the output frame rate, the controller 210 of the whiteboard presentation system 200 inserts additional frames inserted between frames generated in the canvas generation process in block 320, as part of the execution of the software applications 226. As an interpolation, an exponential smoothing technique known in the art may be used. For example, each of frames 1102A, 1102B, and 1102C at 2 ftp, as shown in FIG. 11A, is blended with a neighboring frame to generate new frames to insert between the two neighboring frames. In blending two neighboring frames (a first frame and a second frame) to generate a new frame in between, the ratio of blending the first frame fades out and the ratio of blending the second frame fads in when the new frame is positioned farther in time from the first frame and closer in time to the second frame, as shown in FIG. 11B. The frame interpolated video data is stored in the memory 214 of the whiteboard presentation system 200.

Figure 12:
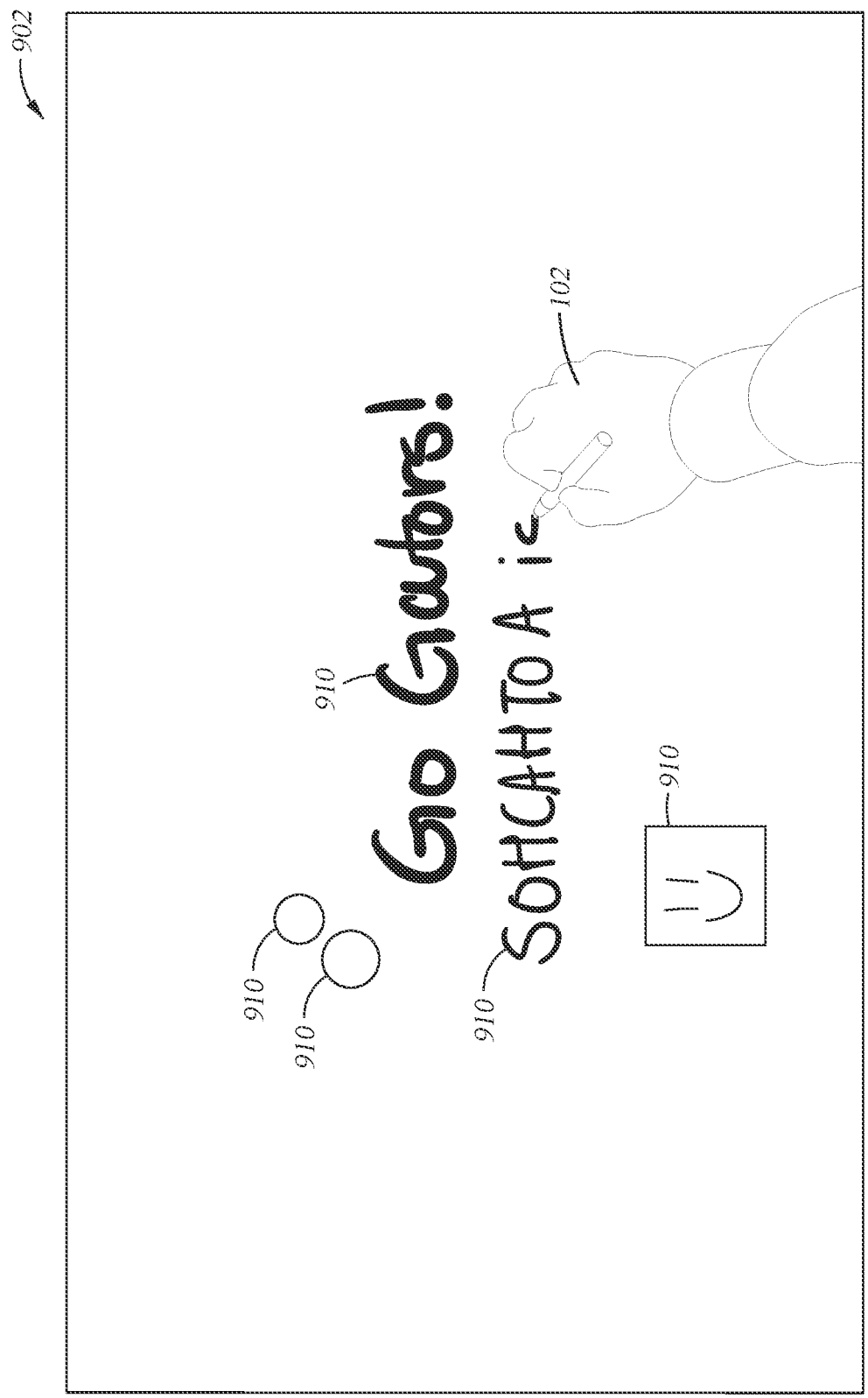
FIG. 12 illustrates an example of a lightly rendered image of a presenter according to one embodiment.

In block 1020, a ghosting process is performed, to lightly render the image of the presenter 102 in the video data. In the ghosting process in block 1020, the controller 210 of the whiteboard presentation system 200 lightly renders the image (i.e., with each pixel's value decreased from the original value) of the presenter 102 segmented in the canvas generation process in block 320 on the canvas in the most recent frame, as part of the execution of the software applications 226 as shown in FIG. 12. The ghosting process may be performed at the frame rate of the video data generated in block 1010. The lightly rendered image of the presenter 102 informs a viewer of movement of the presenter 102 and timing of a start of the generation of the presentation information. To avoid latency between rendering of the presenter and the generation of a presentation information, the same image of the presenter 102 is rendered during a latency time of the canvas generation process in block 320. The latency time of the canvas generation process in block 320 may be, for example, about 1.2 seconds, or 1.5 seconds. The video data generated in block 1020 is transmitted in the video data transmission process in block 350.

The embodiments described above provide methods and systems to perform remote whiteboard presentation in a video conference environment. In the methods described herein, a visible image of a whiteboard, as a presenter made writing, notes, drawings, or the like on the whiteboard, is processed such that the presenter is removed from the visible image of the whiteboard and a background to the writing, notes, drawings, or the like is cleaned, and the processed image is transmitted across the video conference environment. The methods described utilize deep neural networks, such as convolutional neural networks, for image segmentation, and thus provide significantly better quality in the processed images.

While the foregoing is directed to embodiments of the present disclosure, other and further embodiments of the disclosure may be devised without departing from the basic scope thereof, and the scope thereof is determined by the claims that follow.

The invention claimed is:

1. A method of processing images, comprising:
capturing, by a camera device, a first image of a surface, wherein the first image comprises presentation information that is disposed on at least a portion of the surface, and a portion of a presenter that is disposed between the camera device and the surface;
performing a presenter segmentation process, comprising:
detecting the portion of the presenter in a second image that is derived from the first image; and
generating a presenter mask that is used to define pixels in the first image that are associated with the detected portion of the presenter;
performing a canvas reconstruction process, comprising:
replacing the pixels in the first image that are associated with the detected portion of the presenter within the presenter mask to form a reconstructed canvas image;
performing a presentation information segmentation process, comprising:
detecting presentation information in the reconstructed canvas image; and
generating a presentation information mask that includes pixels in the reconstructed canvas image that contain portions of the presentation information;
performing a background reconstruction process, comprising:
applying the generated presentation information mask to the reconstructed canvas image to determine the pixels that contain the portions of the presentation information; and
reconstructing the pixels in the reconstructed canvas image that contain the portion of the presentation information to form a canvas background image; and
performing a background bleaching process, comprising:
removing imperfections in the reconstructed canvas image by dividing the reconstructed canvas image by the canvas background image.

2. The method of claim 1, wherein the replacing the pixels in the first image that are associated with the detected portion of the presenter further comprises:
replacing the pixels with corresponding pixels from a canvas image captured before the first image was captured.

3. The method of claim 1, wherein reconstructing the pixels in the reconstructed canvas image that contain the portion of the presentation information further comprises:
in-painting the pixels in the reconstructed canvas image that contain the portion of the presentation information in the canvas background image.

4. The method of claim 1, further comprising:
correcting perspective distortion of the first image, prior to the presenter segmentation process.

5. The method of claim 1, wherein the second image is a lower resolution version of the first image.

6. The method of claim 1, further comprising:
performing an image stabilization process subsequent to the background bleaching process, the image stabilization process comprising:
compensating for errors in the presentation information segmentation process, the background reconstruction process, and the background bleaching process.

7. The method of claim 6, wherein
the presenter segmentation process is performed at a first resolution level,
the canvas reconstruction process, the background bleaching process, and the image stabilization process are performed at a second resolution level that is the same as a resolution of the first image, and
the presentation information segmentation process, the background reconstruction process are performed at a third resolution level, the third resolution level being higher than the first resolution level and lower than second resolution level.

8. The method of claim 1, further comprising performing a start-presentation generation process.

9. A method of delivering presentation information disposed on a surface to an electronic device, comprising:
performing, by a controller, a calibration process, comprising:
capturing, by a camera device, a first image of a surface;
determining corners of the surface in the first image; and
determining size and shape of a canvas image having determined corners; and
performing, by the controller, a canvas generation process, comprising:
capturing, by the camera device, a second image of the surface, wherein the second image comprises presentation information that is disposed on at least a portion of the surface, and a portion of a presenter that is disposed between the camera device and the surface;
performing a presenter segmentation process, comprising:
detecting the portion of the presenter in a third image that is derived from the second image; and
generating a presenter mask that is used to define pixels in the second image that are associated with the detected portion of the presenter;
performing a canvas reconstruction process, comprising:

replacing the pixels in the second image that are associated with the detected portion of the presenter within the presenter mask to form a reconstructed canvas image;

performing a presentation information segmentation process, comprising:
  detecting presentation information in the reconstructed canvas image; and
  generating a presentation information mask that includes pixels in the reconstructed canvas image that contain portions of the presentation information;

performing a background reconstruction process, comprising:
  applying the generated presentation information mask to the reconstructed canvas image to determine the pixels that contain the portions of the presentation information; and
  reconstructing the pixels in the reconstructed canvas image that contain the portion of the presentation information to form a canvas background image; and performing a background bleaching process, comprising:
  removing imperfections in the reconstructed canvas image by dividing the reconstructed canvas image by the canvas background image.

10. The method of claim 9, wherein the calibration process further comprises:
  performing a predefined perspective correction process, comprising:
    correcting perspective distortion of the first image, the first image having a visible frame;
  performing a first corner detection process, comprising:
    detecting a location of a first corner of the surface in the first image;
  performing a flipping process, comprising:
    rotating the first image;
  performing a second corner detection process, comprising:
    detecting a location of a second corner of the surface in the first image;
  performing the flipping process, comprising:
    rotate the first image;
  performing a third corner detection process, comprising:
    detecting a location of a third corner of the surface in the first image;
  performing the flipping process, comprising:
    rotating the first image of the surface;
  performing a fourth corner detection process, to detect a location of a fourth corner of the surface in the first image;
  performing a false detection filtering process, comprising:
    rejecting any of the detected locations of the first, second, third, and fourth corners of the surface outside of the visible frame;
  performing a corner post process, comprising:
    determining size and shape of an initial canvas image;
  performing a fine turning process, to accurately determine a location of a center of the corners; and
  performing a corner transformation process, comprising:
    transform the determined locations of the corners to coordinates of the initial canvas image.

11. The method of claim 9, wherein the replacing the pixels in the first image that are associated with the detected portion of the presenter further comprises:
  replacing the pixels with corresponding pixels from a canvas image captured before the first image was captured.

12. The method of claim 9, wherein reconstructed the pixels in the reconstructed canvas image that contain the portion of the presentation information further comprises:
  in-painting the pixels in the reconstructed canvas image that contain the portion of the presentation information in the canvas background image.

13. The method of claim 9, wherein the canvas generation process further comprises:
  correcting perspective distortion of the second image, prior to the presenter segmentation process.

14. The method of claim 9, wherein the third image is a lower resolution version of the second image.

15. The method of claim 9, wherein the canvas generation process further comprises:
  performing an image stabilization process subsequent to the background bleaching process, the image stabilization process comprising:
    compensating errors in the presentation information segmentation process, the background reconstruction process, and the background bleaching process.

16. The method of claim 15, wherein
  the presenter segmentation process is performed at a first resolution level,
  the canvas reconstruction process and the image stabilization process are performed at a second resolution level that is the same as a resolution of the second image, and
  the presentation information segmentation process, the background reconstruction process are performed at a third resolution level, the third resolution level being higher than the first resolution level and lower than second resolution level.

17. The method of claim 9, where the canvas generation process further comprises:
  performing a start-presentation generation process.

18. The method of claim 9, where the canvas generation process further comprises:
  performing a video data generation process, by the controller, the video data generation process comprising:
    generating video data by concatenating the reconstructed canvas image generated in the canvas generation process.

19. The method of claim 18, wherein the video data generation process comprises:
  performing a frame interpolation process, comprising:
    generating video data at a frame rate higher than a frame rate of the canvas generation process; and
  performing a ghosting process, comprising:
    lightly rendering the image of the presenter on the video data.

20. The method of claim 18, further comprising:
  performing a video transmission process, comprising:
    encoding the video data generated in the video data generation process and transmit the encoded video data to a user device.

21. A system for delivering presentation information on a surface to an electronic device, the system comprising:
  a camera device; and
  a controller comprising a processor and a non-transitory computer readable medium that includes instructions which when executed by the processor are configured to cause the system to:
    capture, by the camera device, a first image of a surface, wherein the first image comprises presentation information that is disposed on at least a portion of the surface, and a portion of a presenter that is disposed between the camera device and the surface;
perform a presenter segmentation process, comprising:
  detect the portion of the presenter in a second image that is derived from the first image; and
  generate a presenter mask that is used to define pixels in the first image that are associated with the detected portion of the presenter;
perform a canvas reconstruction process, comprising:
  replace the pixels in the first image that are associated with the detected portion of the presenter within the presenter mask to form a reconstructed canvas image;
perform a presentation information segmentation process, comprising:
  detect presentation information in the reconstructed canvas image; and
  generate a presentation information mask that includes pixels in the reconstructed canvas image that contain portions of the presentation information;
perform a background reconstruction process, comprising:
  apply the generated presentation information mask to the reconstructed canvas image to determine the pixels that contain the portions of the presentation information; and
  reconstruct the pixels in the reconstructed canvas image that contain the portion of the presentation information to form a canvas background image; and
perform a background bleaching process, comprising:
  remove imperfections in the reconstructed canvas image by dividing the reconstructed canvas image by the canvas background image.

* * * * *